United States Patent [19]

Matsumoto et al.

[11] Patent Number: 5,600,613
[45] Date of Patent: Feb. 4, 1997

[54] OPTICAL INFORMATION RECORDING/REPRODUCTION APPARATUS AND METHOD USING AN ULTRASONIC WAVE MOTOR TO DRIVE ONE OF AN OPTICAL HEAD AND A RECORDING MEDIUM

[75] Inventors: Kazuaki Matsumoto, Kawasaki; Hiroto Kitai, Tokyo, both of Japan

[73] Assignee: Canon Kabushiki Kaisha, Tokyo, Japan

[21] Appl. No.: 329,307

[22] Filed: Oct. 26, 1994

[30] Foreign Application Priority Data

Oct. 27, 1993 [JP] Japan .................................. 5-289804
Mar. 24, 1994 [JP] Japan .................................. 6-053729

[51] Int. Cl.[6] .................................................... G11B 7/00
[52] U.S. Cl. .............................................. 369/32; 369/112
[58] Field of Search ............................... 369/32, 54, 50, 369/44.27, 44.28, 44.29, 44.25, 112

[56] References Cited

U.S. PATENT DOCUMENTS

| | | | |
|---|---|---|---|
| 4,853,919 | 8/1989 | Miyawaki et al. | 369/32 |
| 4,982,394 | 1/1991 | Kanda et al. | 369/32 |
| 5,050,146 | 9/1991 | Richgels et al. | 369/32 |
| 5,241,522 | 8/1993 | Yanagi | 369/32 |
| 5,331,621 | 7/1994 | Miyake et al. | 369/32 |

FOREIGN PATENT DOCUMENTS 0617415 9/1994 European Pat. Off. .
4-161076 6/1992 Japan .

OTHER PUBLICATIONS

Patent Abstracts of Japan, vol. 016, No. 459, English Abstract of Japanese Patent No. 4–161076, Yamaguchi, Sep. 24, 1992.
Patent Abstracts of Japan, vol. 13, No. 200, English Abstract of Japanese Patent No. 1–021688, Ishidu, May 12, 1989.

*Primary Examiner*—Nabil Hindi
*Attorney, Agent, or Firm*—Fitzpatrick, Cella, Harper & Scinto

[57] ABSTRACT

In an optical information recording/reproducing apparatus, relative movement between an optical head and an optical information recording medium having a linear track is performed to cause a light beam irradiated by the optical head to follow the information track so as to effect recording/reproduction of information. The apparatus is provided with an ultrasonic wave motor for driving one of the recording medium and the optical head relative to each other. The ultrasonic wave motor is controlled to gradually decrease a drive velocity thereof at the end of a drive operation thereof and to gradually increase the drive velocity thereof at the beginning of the drive operation thereof by properly adjusting an amplitude of a drive signal to be supplied to the ultrasonic wave motor.

7 Claims, 19 Drawing Sheets

FIG. 3
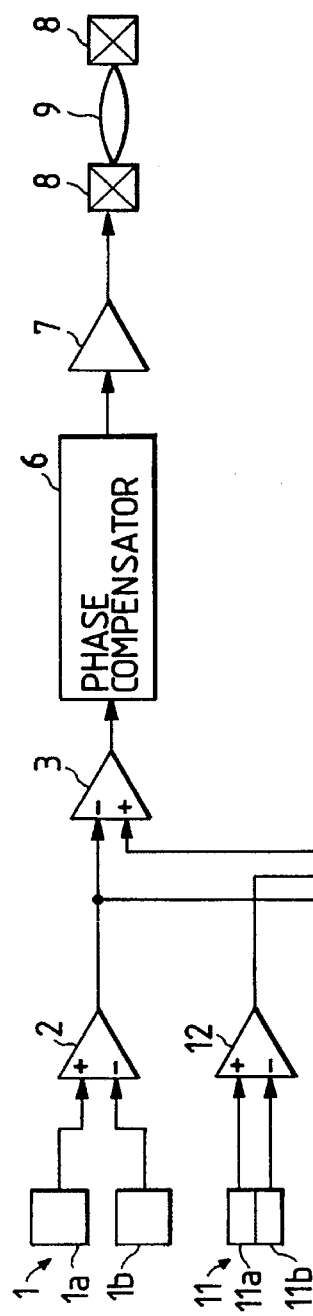
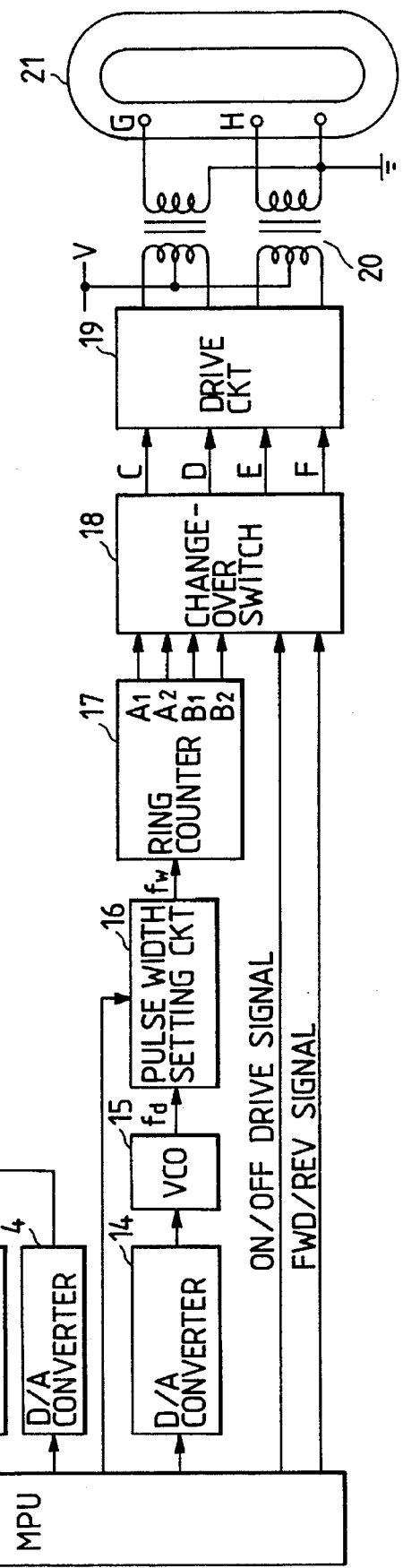

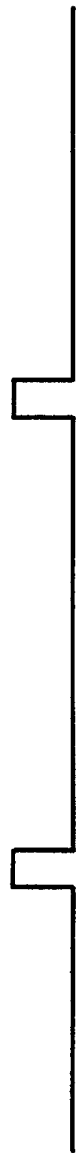
FIG. 4A  OUTPUT OF VCO
FIG. 4B  OUTPUT OF PULSE WIDTH SETTING CKT
FIG. 4C  OUTPUT A1 OF RING COUNTER
FIG. 4D  OUTPUT A2 OF RING COUNTER
FIG. 4E  OUTPUT B1 OF RING COUNTER
FIG. 4F  OUTPUT B2 OF RING COUNTER

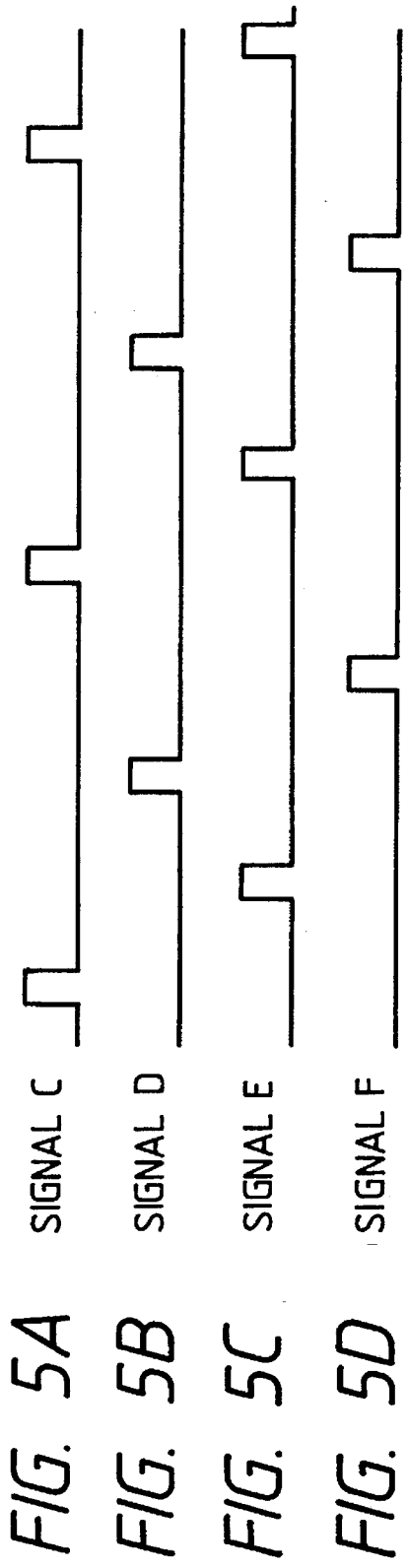
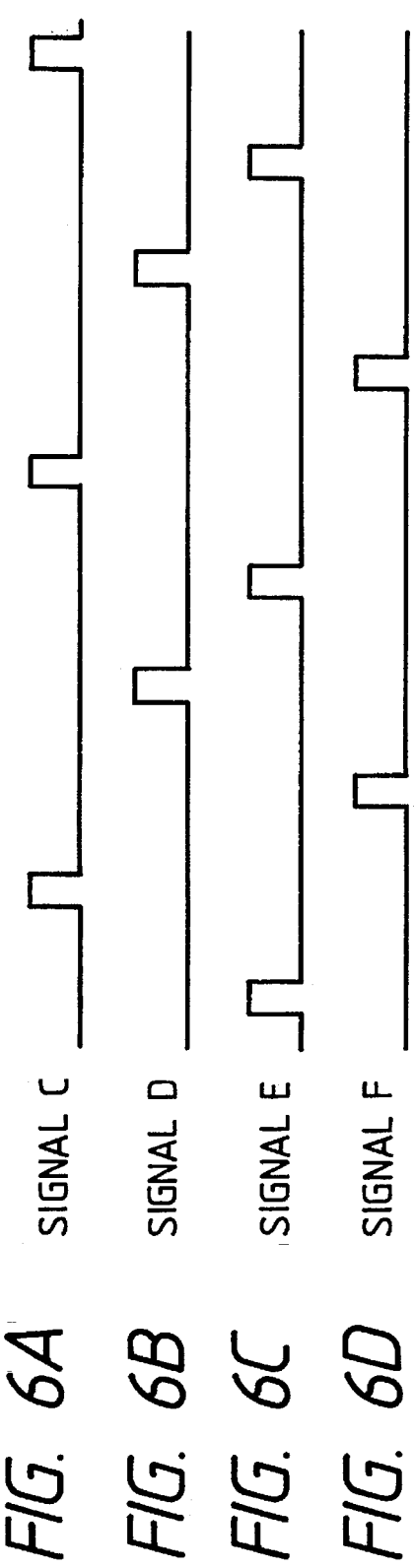

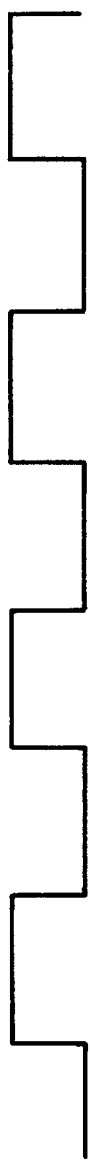
FIG. 7A  NORMAL OUTPUT OF PULSE WIDTH SETTING CKT
FIG. 7B  OUTPUT OF PULSE WIDTH SETTING CKT UPON STOP OF USM DRIVE
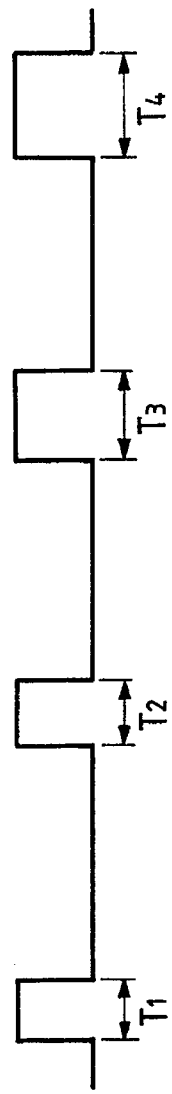
FIG. 7C  OUTPUT OF PULSE WIDTH SETTING CKT UPON START OF USM DRIVE

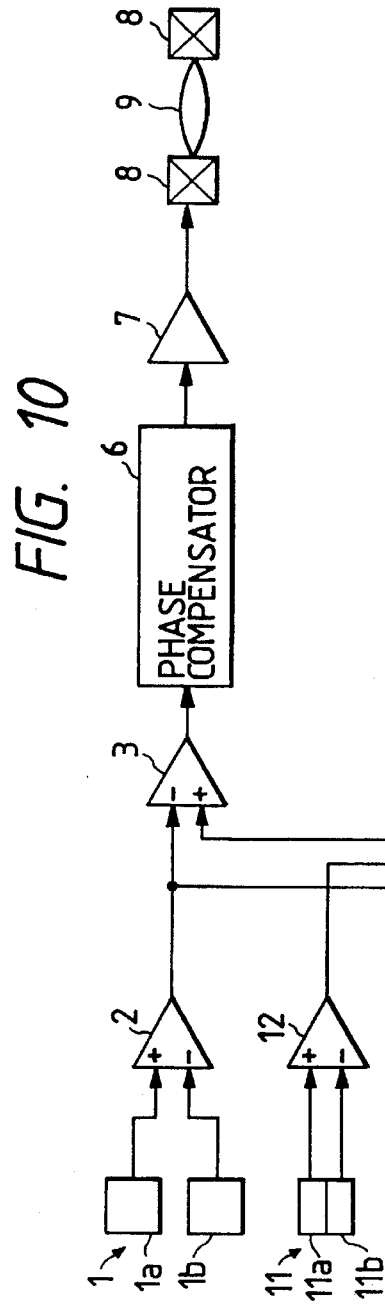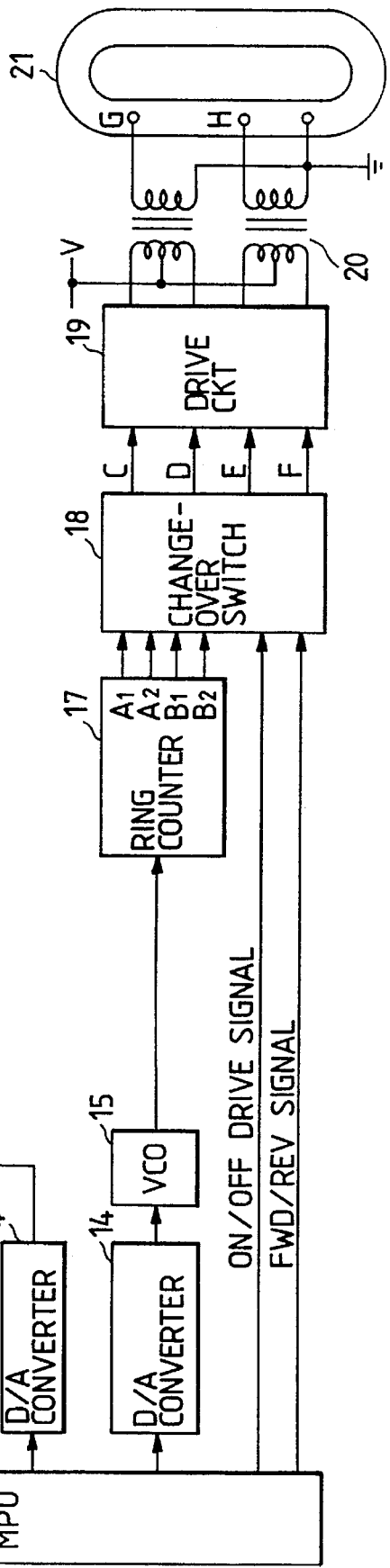
FIG. 10

FIG. 11
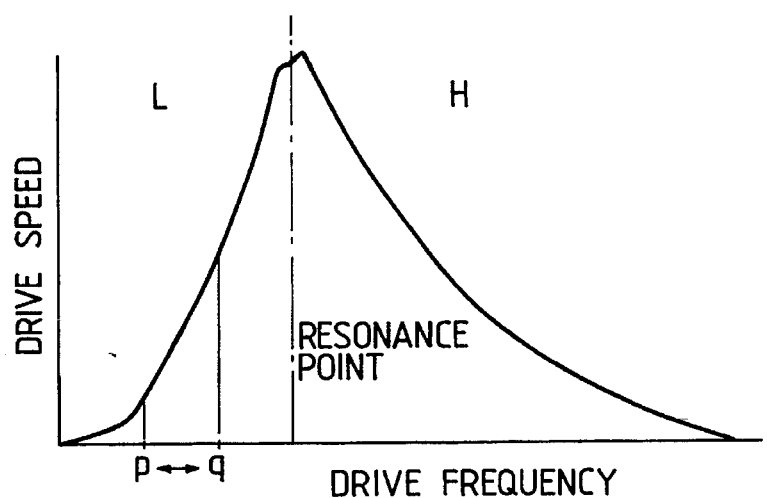
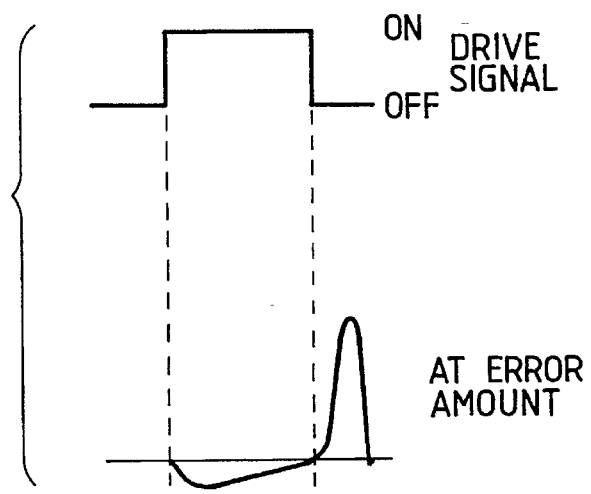
FIG. 12A
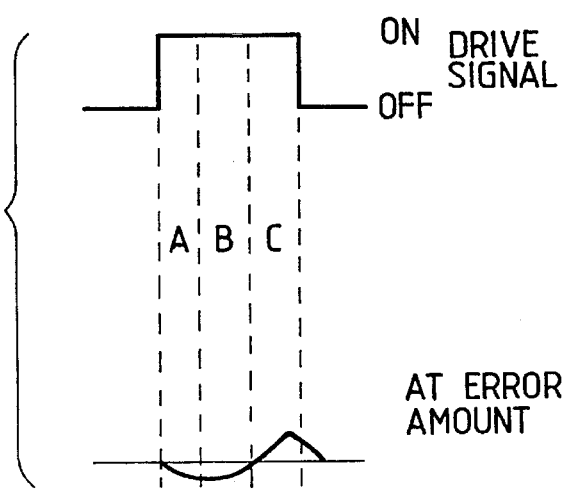
FIG. 12B

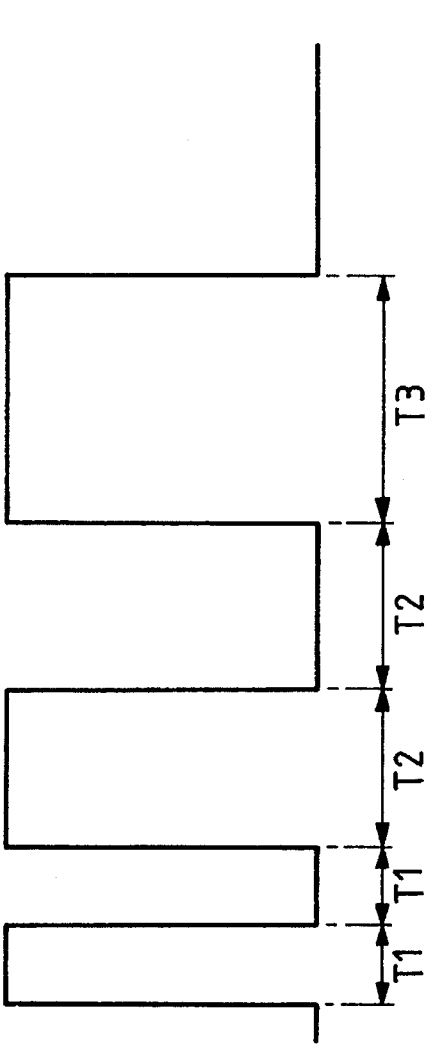
FIG. 13A ON SIGNAL UPON START OF DRIVE
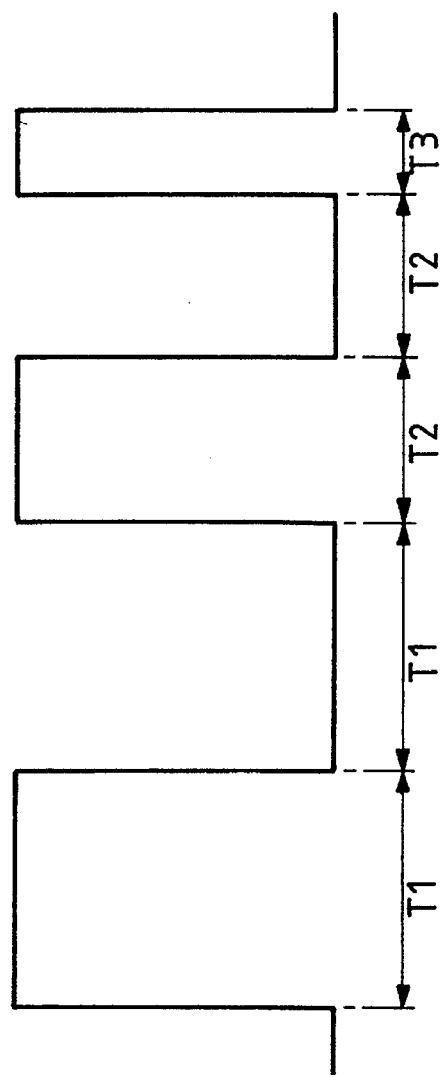
FIG. 13B OFF SIGNAL UPON STOP OF DRIVE

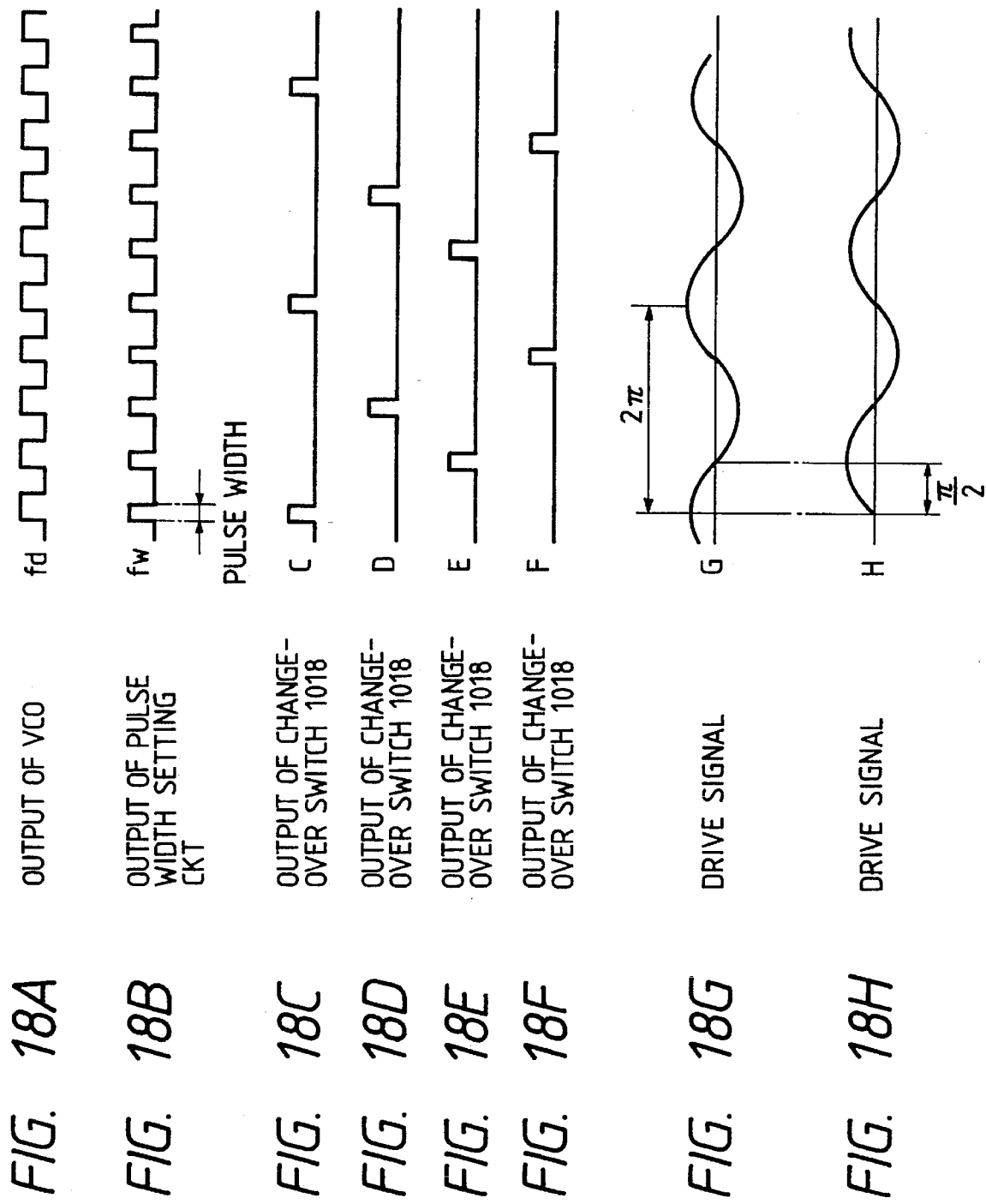

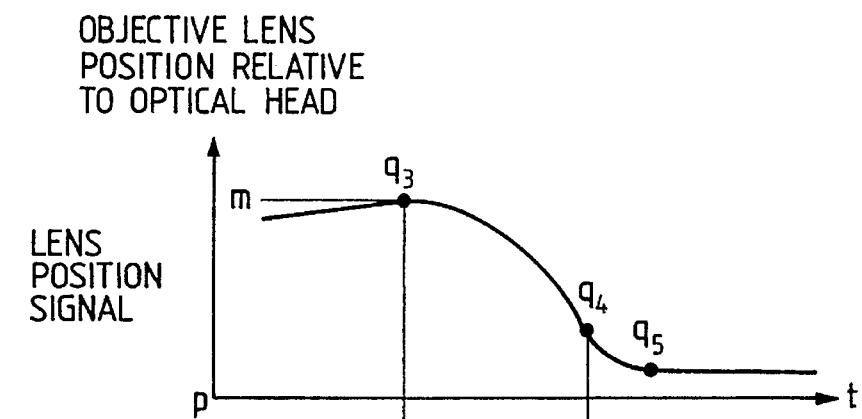
FIG. 19A  LENS POSITION SIGNAL
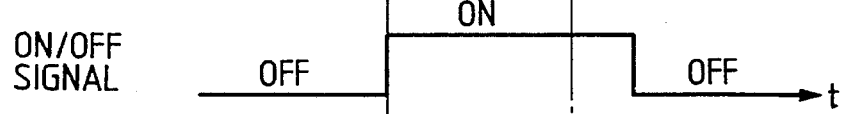
FIG. 19B  ON/OFF SIGNAL
FIG. 19C  PULSE WIDTH OF PULSE WIDTH SETTING CKT
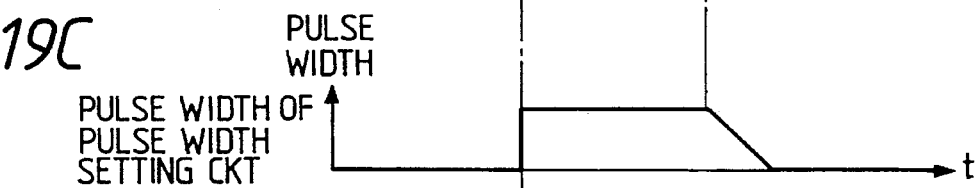
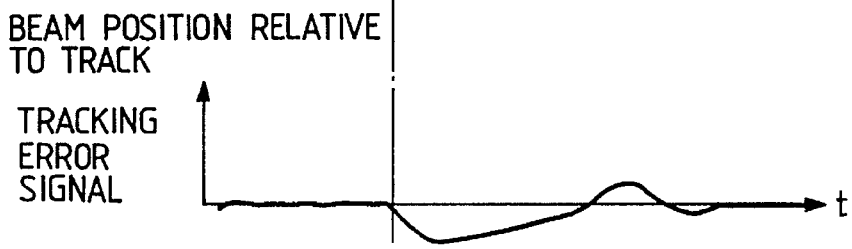
FIG. 19D  TRACKING ERROR SIGNAL FIG. 20A  OBJECTIVE LENS POSITION RELATIVE TO OPTICAL HEAD
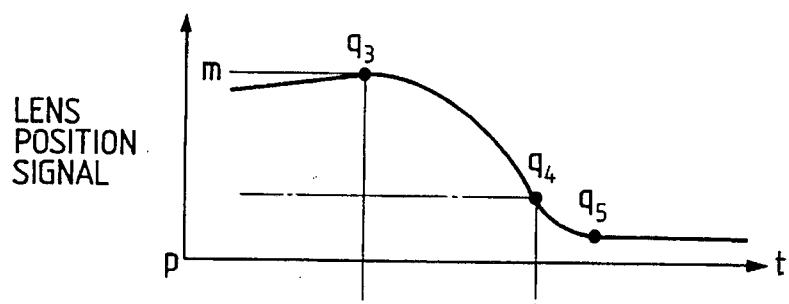
FIG. 20B  ON/OFF SIGNAL
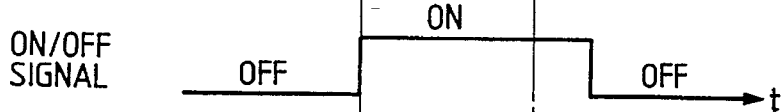
FIG. 20C  PULSE WIDTH OF PULSE WIDTH SETTING CKT
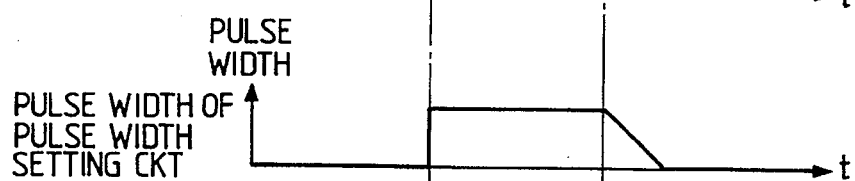
FIG. 20D  BEAM POSITION RELATIVE TO TRACK
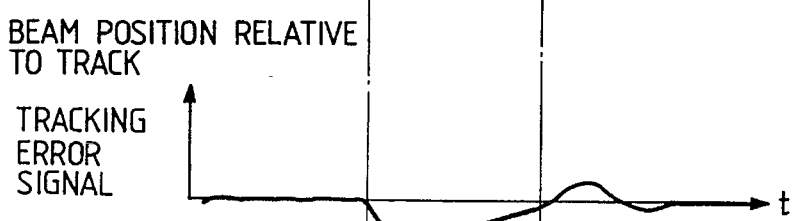
FIG. 20E  MOVING VELOCITY OF OBJECTIVE LENS RELATIVE TO OPTICAL HEAD
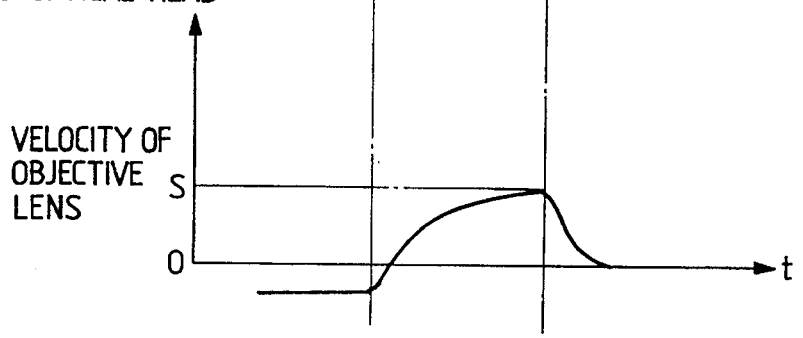

FIG. 21A  OBJECTIVE LENS POSITION RELATIVE TO OPTICAL HEAD
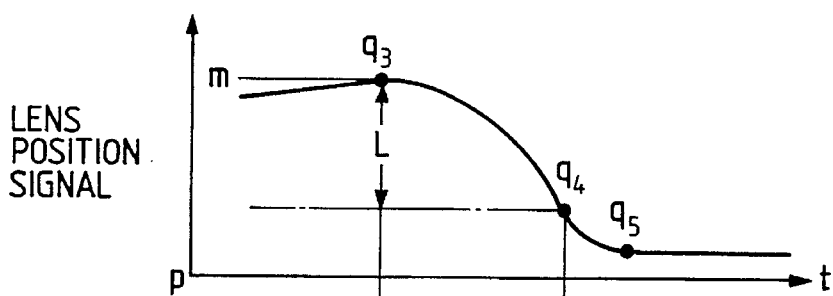
FIG. 21B  ON/OFF SIGNAL
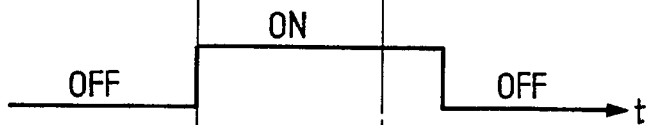
FIG. 21C  PULSE WIDTH OF PULSE WIDTH SETTING CKT
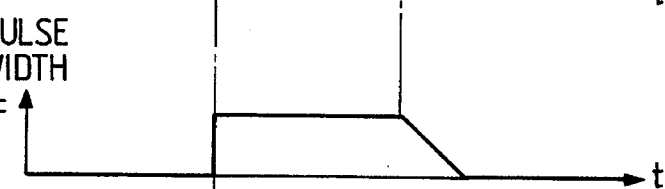
FIG. 21D  BEAM POSITION RELATIVE TO TRACK
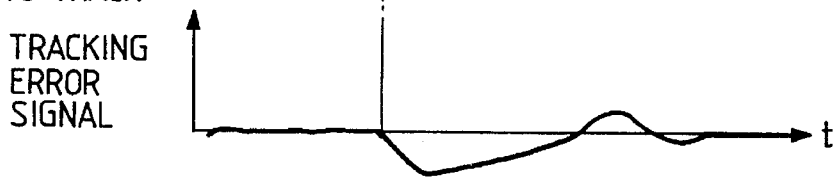

LENS POSITION SIGNAL

ON/OFF SIGNAL

TRACKING ERROR SIGNAL

OPTICAL INFORMATION RECORDING/REPRODUCTION APPARATUS AND METHOD USING AN ULTRASONIC WAVE MOTOR TO DRIVE ONE OF AN OPTICAL HEAD AND A RECORDING MEDIUM

BACKGROUND OF THE INVENTION

1. Field of the Invention

The present invention relates to an optical information recording/reproduction method and apparatus for optically recording/reproducing information on/from a card-shaped recording medium.

2. Related Background Art

Conventionally, a recording medium on which information is optically recorded or from which recorded information is optically read out, can take on various shapes such as a disk shape, a card shape, and the like are known. Of these information recording media, a card-shaped recording medium (to be referred to as an optical card hereinafter) is expected to be in great demand in the future since it is compact, lightweight, and convenient to carry, and has a large recording capacity.

When information is recorded on a recording medium such as an optical card, a light beam, which is modulated in accordance with recording information and is focused to a very small light spot, is scanned on an information track thereof, thereby recording the information as an optically detectable recorded pit string. Upon recording of information, in order to accurately record information without causing trouble such as crossing an information track, auto-tracking control is performed to control the irradiation position of the light beam in the track intersecting direction, so that the light beam is scanned to follow the information track. Of course, upon reproduction of information, auto-tracking control is performed to control the light beam to be scanned to follow the information track.

FIG. 1 is a diagram showing an example of an optical card recording/reproduction apparatus for recording/reproducing information on/from an optical card. Referring to FIG. 1, an optical card 100 as an information recording medium is placed on a shuttle 101. The shuttle 101 is movable in the track intersecting direction by driving an ultrasonic wave motor (to be abbreviated as a USM hereinafter) 103. As will be described later, correction control with respect to a skew of the optical card 100 is realized by moving a light beam in the track intersecting direction under the control of a USM control circuit 104. A semiconductor laser 105 serves as a recording/reproduction light source, and a collimator lens 106 collimates a light beam emitted from the semiconductor laser 105.

A light beam emitted from the semiconductor laser 105 is incident on an objective lens 108 via the collimator lens 106 and a polarization beam splitter 107, and is focused to a very small light spot by the objective lens 108. The optical card 100 is irradiated with the small light spot. The irradiated light is reflected by the surface of the optical card 100, and the reflected light is converted into collimated light again via the objective lens 108. The collimated light is transmitted through the polarization beam splitter 107, and is guided to a polarization beam splitter 109. The collimated light is reflected by the polarization beam splitter 109, and is focused by a focusing lens 110. The focused light is received by a photoelectric conversion element 111 for tracking control. The above-mentioned optical elements such as the semiconductor laser 105, the objective lens 108, the photoelectric conversion element 111, and the like are integrated as an optical head 102, and the optical head 102 is reciprocally movable in the track direction of the optical card 101. Therefore, upon reciprocal movement of the optical head 102, the light beam output from the optical head 102 is reciprocally moved relative to the optical card 100, and the light beam scans an information track. Note that the optical head 102 may be fixed in the track direction, and the shuttle 101 may be reciprocally moved in the track direction.

The light-receiving signal of the photoelectric conversion element 111 is input to a tracking control circuit 112, and the tracking control circuit 112 generates a tracking error signal indicating a shift amount and a shift direction of the light beam with respect to the track on the basis of the light-receiving signal. The tracking control circuit 112 drives a tracking actuator 113 on the basis of the tracking error signal to finely move the objective lens 108 in the track intersecting direction, thus performing the tracking control, so that the light beam does not fall outside the information track upon scanning of the light beam, as described above. In this manner, the tracking control of the light beam is performed, and information is recorded or reproduced under the tracking control upon recording or reproduction of information.

Note that each information track of the optical card 100 is often not parallel to the track direction but is slightly inclined at a skew angle $\theta$, as shown in FIG. 2. When a light beam is scanned on the optical card with a skew under the tracking control, since the movable range of the objective lens 108 is limited, the light beam sometimes falls outside the control range of the tracking control, and cannot follow the information track. In such a case, correction control of the optical card 100 with respect to a skew is performed by moving the optical card 100 in the track intersecting direction by the USM 103. More specifically, assume that the movable range of the objective lens 108 is a ±25-μm range on each of the right and left sides of the lens center, and the light beam from the optical head 102 is scanned on an information track of the optical card, which has the skew angle $\theta$, as shown in FIG. 2. At this time, even when the optical card is skewed, the objective lens 108 is driven in correspondence with the skew under the tracking control as long as the information track is present within the movable range of the objective lens 108. For this reason, the optical beam is scanned to track the information track.

On the other hand, when the objective lens 108 moves to the right or left from the central position of the optical head 102 by 25 μm as the movable range, the tracking control circuit 112 outputs a control signal to the USM control circuit 104 to move the shuttle 101, so that the objective lens 108 returns to the central position of the optical head 102. In response to this signal, the USM control circuit 104 controls the USM 103 to move the shuttle 101 in the track intersecting direction. In this state, since the tracking control is active, the objective lens 108 moves toward the center of the optical head to follow the shuttle 101. In this case, the USM control circuit 104 outputs two-phase sine wave drive signals having a 90° phase difference therebetween to drive the USM 103. When the objective lens 108 reaches the center of the optical head 102, i.e., the center of the movable range, the tracking control circuit 112 outputs a control signal to the USM control circuit 104 to stop the shuttle 101. In this manner, when the optical card 100 is skewed, the objective lens 108 is controlled to return to the center of the optical head 102 by moving the shuttle 101, and the correction control for the positional relationship between the light beam and the information track is performed.

However, the conventional information recording/reproduction apparatus uses the USM as drive means for moving the shuttle in the track intersecting direction. When a means with high response characteristics such as a USM is used, the shuttle is abruptly accelerated upon the start of the drive operation of the USM, and is abruptly decelerated upon stopping of the drive operation. For this reason, the tracking error amount (AT error amount) undesirably increases upon starting and stopping of the drive operation of the USM, and if the AT error amount is too large, overrun may occur or failure of AT control may occur. In particular, a change in the tracking error amount upon stopping of the driving operation is large, and AT control failure upon stopping of the driving operation poses a serious problem.

SUMMARY OF THE INVENTION

The present invention has been made in consideration of the conventional problems, and has as its object to provide an optical information recording/reproduction method and apparatus, which can prevent an increase in the AT error amount by suppressing abrupt acceleration/deceleration of a shuttle, and can stabilize the operation thereof.

In order to achieve the above object, there is provided an optical information recording/reproduction apparatus in which relative movement between an optical information recording medium having a linear information track and an optical head is perfomed, and a light beam radiating from the optical head is caused to follow the information track by tracking control so as to perform at least one of recording and reproduction of information, comprising:

an ultrasonic wave motor for driving one of the medium and the optical head relative to the other; and control means for controlling the ultrasonic motor to gradually decrease the drive velocity of the ultrasonic wave motor at the end of a drive operation of the ultrasonic wave motor.

In order to achieve the above object, there is also provided an optical information recording/reproduction method in which relative movement between an optical information recording medium having a linear information track and an optical head is performed, and a light beam radiating from the optical head is caused to follow the information track by tracking control so as to perform at least one of recording and reproduction of information, comprising:

the step of moving one of the medium and the optical head relative to the other using an ultrasonic wave motor; and the step of controlling the ultrasonic wave motor to gradually decrease the drive velocity of the ultrasonic wave motor at the end of the relative movement.

BRIEF DESCRIPTION OF THE DRAWINGS

FIG. 3 is a block diagram showing the first embodiment of an optical information recording/reproduction apparatus according to the present invention;

FIGS. 4A to 4F are timing charts showing the output signals from a VCO, a pulse width setting circuit, and a ring counter in the embodiment shown in FIG. 3;

FIGS. 5A to 5D are timing charts showing the output signals from a change-over switch in an operation, in the forward direction, of a USM of the embodiment shown in FIG. 3;

FIGS. 6A to 6D are timing charts showing the output signals from the change-over switch in an operation, in the reverse direction, of the USM of the embodiment shown in FIG. 3;

FIGS. 7A to 7C are timing charts showing the output signals in a normal state of the pulse width setting circuit, and upon starting and stopping of the drive operation of the USM in the embodiment shown in FIG. 3;

FIG. 10 is a block diagram showing the second embodiment of the present invention;

FIG. 11 is a graph showing the relationship between the drive frequency and the drive speed of the USM in the embodiment shown in FIG. 10;

FIGS. 12A and 12B are charts for comparing the AT error amounts between the prior art and the embodiment shown in FIG. 10;

FIGS. 13A and 13B are timing charts showing ON and OFF signals output from an MPU as signals for instructing starting and stopping of the drive operation of a USM upon starting and stopping of the drive operation of the USM in the third embodiment of the present invention;

FIGS. 18A to 18H are timing charts showing signals of the respective units in the apparatus shown in FIG. 17;

FIGS. 19A to 19D are charts for explaining the control operation of an ultrasonic wave motor in the apparatus shown in FIG. 17;

FIGS. 20A to 20E are charts for explaining the control operation of the fifth embodiment of the present invention;

FIGS. 21A to 21D are charts for explaining the control operation of the sixth embodiment of the present invention.

DETAILED DESCRIPTION OF THE PREFERRED EMBODIMENTS

[First Embodiment]

Figure 1:
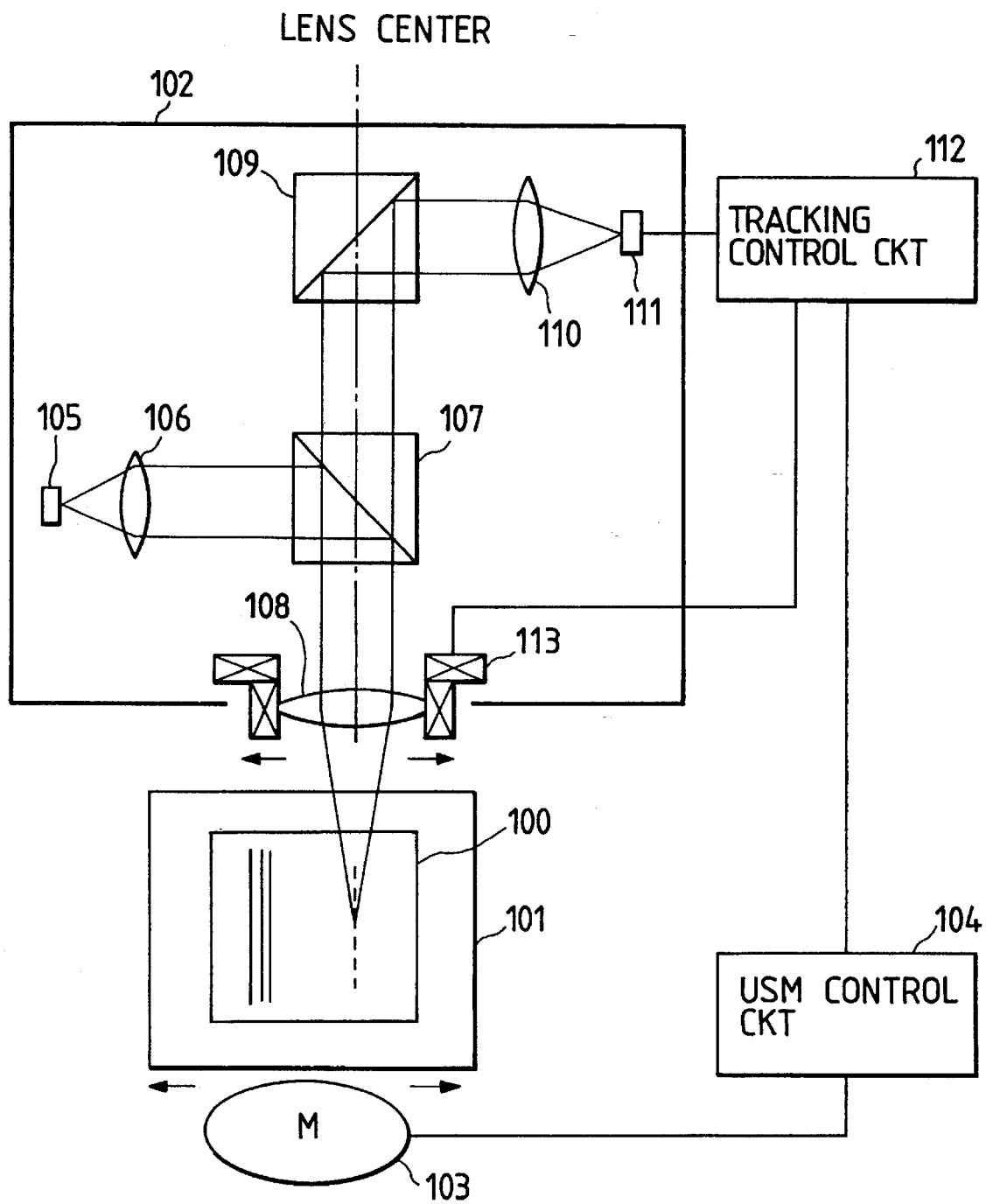
FIG. 1 is a schematic diagram showing a conventional optical card information recording/reproduction apparatus.

The first embodiment of the present invention will be described in detail hereinafter with reference to the accompanying drawings. FIG. 3 is a block diagram showing the first embodiment of an optical information recording/reproduction apparatus according to the present invention. Referring to FIG. 3, a photodetector 1 is used for detecting reflected light beams of two light spots for tracking control, which spots radiate from a semiconductor laser as a light source onto an optical card. The photodetector 1 corresponds to the photoelectric conversion element 111 shown in FIG. 1. The two light spots for the tracking control are generated by, e.g., splitting a light beam emitted from the semiconductor laser into three beams, i.e., a main beam and two side beams, and of these beams, two side beams are applied onto two tracking tracks arranged on the two sides of an information track of the optical card. The photodetector 1 comprises detection elements 1a and 1b in correspondence with the two light spots, and the reflected beams of the two light spots reflected by the tracking tracks are respectively detected by the detection elements 1a and 1b. The detection signals from the detection elements 1a and 1b are differentially detected by a differential amplifier 2, and a tracking error signal is output. The tracking error signal is binarized with a predetermined slice level by a comparator 10, and the binary signal is output to an MPU 5. The MPU 5 is a microprocessor circuit for controlling the respective units in the apparatus.

A differential amplifier 3 receives a predetermined voltage from the MPU 5 via a D/A converter 4 when a track jump operation using an objective lens 9 is performed. In the track jump operation, a tracking servo loop is disabled by a switch (not shown). In the track jump operation, the tracking error signal from the differential amplifier 2 is binarized by the comparator 10, and the binary signal is input to the MPU 5. The MPU 5 executes control for locking the light beam at a target information track at a zero-crossing point again on the basis of the input signal. A phase compensator 6 is used for stabilizing the tracking servo loop. An AT coil driver 7 drives a tracking actuator coil (AT coil) 8 by power-amplifying the tracking error signal. The objective lens 9 focuses a light beam emitted from the semiconductor laser as a light source, and irradiates the optical card with the focused light beam as a very small light spot. The tracking error signal detected by the differential amplifier 2 is output to the AT coil 8 via the differential amplifier 3, the phase comparator 6, and the AT coil driver 7. The AT coil 8 is driven on the basis of the tracking error signal to finely move the objective lens 9 in the tracking direction. In this manner, tracking control for scanning the light spot to follow the information track is performed.

A lens position sensor 11 is used for detecting the position, in the tracking direction, of the objective lens 9. The lens position sensor 11 comprises two light-receiving elements 11a and 11b, and a reflection plate (not shown) adheres to the side surface of a lens barrel of the objective lens 9 to face the lens position sensor 11. Light irradiates the reflection plate from a light-emitting element (not shown), and light reflected by the reflection plate is detected by the two light-receiving elements 11a and 11b of the position sensor 11. In this case, since the light-receiving amounts of the light-receiving elements 11a and 11b of the position sensor change in correspondence with the position, in the tracking direction, of the objective lens 9, a lens position signal corresponding to the position of the objective lens 9 can be obtained by differentially detecting the detection signals from the light-receiving elements 11a and 11b by a differential amplifier 12. The lens position signal is converted into a digital signal by an A/D converter 13, and the digital signal is supplied to the MPU 5.

An D/A converter 14 applies an analog voltage to a voltage controlled oscillator (VCO) 15 in accordance with an instruction from the MPU 5. The VCO 15 changes the frequency of an output signal in correspondence with the input voltage to attain voltage/frequency conversion, and outputs an output signal fd having a frequency corresponding to the input voltage. A pulse width setting circuit 16 converts the pulse width of the output signal fd from the VCO 15 into a predetermined pulse width in accordance with an instruction from the MPU 5 and outputs an output signal fw having the predetermined pulse width. A ring counter 17 frequency-divides the output signal fw from the pulse width setting circuit 16 to ¼, separates the frequency-divided signals into four signals, and outputs the four signals while shifting their phases by 90°. A change-over switch 18 selects and outputs the output signals from the ring counter 17 on the basis of an ON/OFF drive signal for instructing whether a USM 21 is to be driven or stopped and a FWD/REV signal for instructing the forward or reverse drive direction of the USM 21, which signals are output from the change-over switch 18. A drive circuit 19 power-amplifies the outputs from the change-over switch 18. A booster circuit 20 boosts the outputs from the drive circuit 19. The USM 21 is used for moving a shuttle 101, on which an optical card 100 is placed, in the track intersecting direction, as has been described above with reference to FIG. 1.

The operation of this embodiment will be described in detail below. Upon recording or reproduction of information, one of an optical head and an optical card is reciprocally moved in the track direction, and a light beam from the optical head is reciprocally moved relative to the optical card. In this state, assume that the tracking servo loop from the photodetector 1 to the AT coil 8 in FIG. 3 is in an ON state, and the light beam radiated by the optical head is scanned to follow an information track of the optical card by the tracking control operation. Although not shown in FIG. 3, a focus servo loop for adjusting the focal point of the light beam to the optical card surface is also provided, and the light beam irradiated by the optical head scans on the information track while maintaining an in-focus state to the card surface by the focus control operation.

Figure 2:
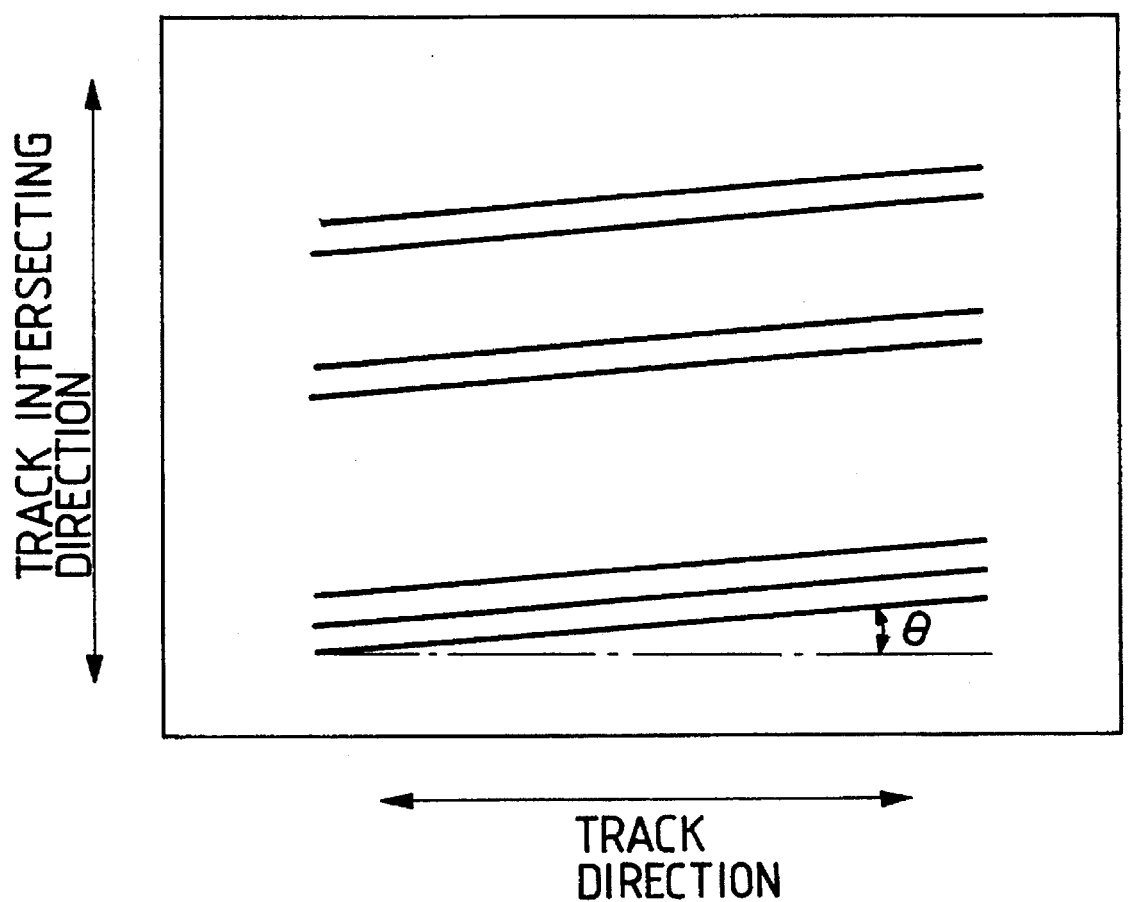
FIG. 2 is the plan view for explaining a skew of an optical card.

Note that the optical card is skewed, as shown in FIG. 2. For this reason, when the tracking control is executed by the tracking servo loop, the objective lens 9 moves in the tracking direction in correspondence with the skew. Assume that the movable range, in the tracking direction, of the objective lens 9 is, e.g., a ±25-μm range centering at the central position of the objective lens 9. The position, in the tracking direction, of the objective lens 9 is detected by the lens position sensor 11, and the output from the sensor 11 is fetched by the MPU 5 via the A/D converter 13. More specifically, the MPU 5 monitors the position of the objective lens 9. As described above, when the objective lens moves in correspondence with the skew and has reached a position near the limit of the movable range, the MPU 5 drives the USM 21 to move the shuttle, which carries the optical card, in the tracking direction. In this manner, control for returning the objective lens 9 to the center of the optical head is performed.

The control operation of the USM 21 will be described below. FIGS. 4A to 4F are timing charts showing signals of the respective sections of a control circuit for controlling the drive operation of the USM 21. FIG. 4A shows the output signal from the VCO 15, and FIG. 4B shows the output signal from the pulse width setting circuit 16. During the operation of the apparatus, the MPU 5 inputs a predetermined voltage to the VCO 15 via the D/A converter 14, and the VCO 15 converts the input voltage into a frequency, as shown in FIG. 4A, thus outputting a pulse signal having a predetermined frequency corresponding to the input voltage. Also, the MPU 5 outputs a control signal for instructing the setting of a pulse width by the pulse width setting circuit 16, and the pulse width setting circuit 16 sets the pulse width on the basis of the input instruction, thus outputting a pulse signal with the designated pulse width, as shown in FIG. 4B. The ring counter 17 frequency-divides the pulse signal to ¼, and separates the frequency-divided signal into four signals by shifting the phase of the frequency-divided signal by 90°, as shown in FIGS. 4C to 4F. These signals are output as signals $A_1$, $A_2$, $B_1$, and $B_2$. The output signals from the ring counter 17 are output to the change-over switch 18. The change-over switch 18 drives the USM 21 on the basis of the ON/OFF drive signal for instructing the setting of the ON/OFF state of the drive operation and the FWD/REV signal for instructing the setting of the drive direction, which signals are supplied from the MPU 5. In a normal state wherein the USM 21 is not driven, the MPU 5 outputs an OFF signal to the change-over switch 18, and the change-over switch 18 does not output any signals to the drive circuit 19 in accordance with this instruction. As a result, the USM 21 is maintained in a stopped state.

When the MPU 5 recognizes, based on the output from the lens position sensor 11, that the objective lens 9 has moved to a position near a 25-µm position as the limit of the movable range in either the right or left direction in the tracking direction, as described above, the MPU 5 outputs an ON signal for instructing the drive operation of the USM 21 to the change-over switch 18. At the same time, the MPU 5 recognizes the moving direction of the objective lens 9 on the basis of the output from the lens position sensor 11, and outputs the signal for instructing the setting of the drive direction of the USM 21 in correspondence with the recognized moving direction to the change-over switch 18. FIG. 3 illustrates the signal for instructing the setting of the drive direction as the FWD/REV signal. In practice, an FWD signal is output to instruct forward driving, and an REV signal is output to instruct backward driving. Furthermore, when the MPU 5 outputs an ON signal for instructing the performing of the drive operation of the USM 21, it outputs a control signal to the pulse width setting circuit to gradually increase the pulse width only for a predetermined period of time. Also, when the USM 21 is to be stopped, a control signal for gradually decreasing the pulse width only for a predetermined period of time is output. Control of the pulse width of the pulse width setting circuit 16 upon starting and stopping of the drive operation of the USM 21 will be described in detail later.

Upon reception of the ON signal and the signal for instructing the setting of the drive direction from the MPU 5, the change-over switch 18 changes a combination of the four output signals from the ring counter 17 on the basis of the input signals, and outputs the signals to the drive circuit 19. When the MPU 5 instructs driving in the forward direction, the change-over switch 18 outputs the output signals $A_2$ and $B_2$ from the ring counter 17 as signals C and D, and outputs the output signals $A_2$ and $B_2$ as signals E and F, as shown in FIGS. 5A to 5D. On the other hand, when the MPU 5 instructs driving in the reverse direction, the change-over switch 18 outputs the output signals $A_2$ and $B_2$ from the ring counter 17 as signals C and D, and outputs the output signals $A_1$ and $B_2$ as signals E and F, as shown in FIGS. 6A to 6D. Then, the drive circuit 19 generates two sine-wave drive signals having a 90° phase difference therebetween on the basis of the output signals C and D, and E and F from the change-over switch 18, and applies the generated signals to terminals G and H of the USM 21 via the booster circuit 20. For example, in the case of driving in the forward direction, the phase of the sine-wave drive signal applied to the G terminal of the USM 21 is advanced by 90° from that of the signal applied to the H terminal. Conversely, in the case of driving in the reverse direction, the phase of the sine-wave drive signal applied to the H terminal is advanced by 90° from that of the signal applied to the G terminal.

Figure 8:
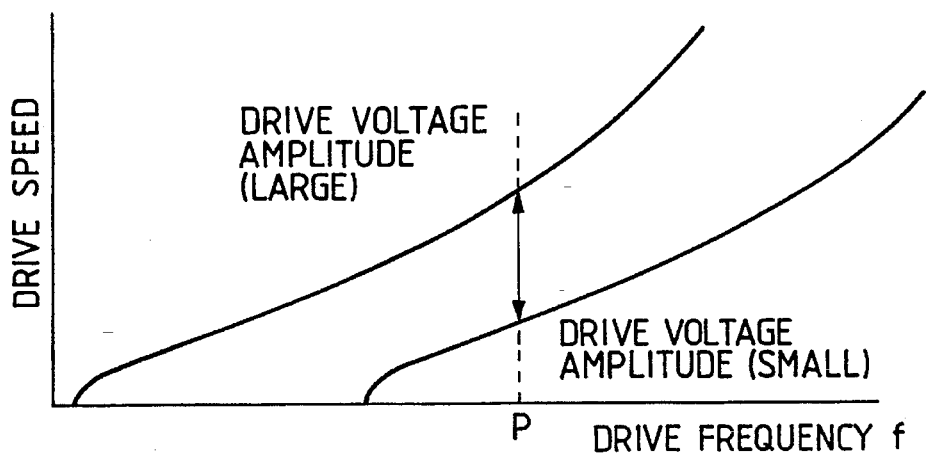
FIG. 8 is a graph showing the relationship between the drive frequency and the drive speed when the drive voltage amplitude of the USM in the embodiment shown in FIG. 3 is changed.

On the other hand, simultaneously with the instruction for the driving operation of the USM 21, as described above, when the MPU 5 outputs a control signal for gradually increasing the pulse width only for a predetermined period of time to the pulse width setting circuit 16, the pulse width setting circuit 16 outputs a pulse signal while increasing the pulse width of the output signal fd having a predetermined frequency from the VCO 15 stepwise like $T_1$, $T_2$, $T_3$, and $T_4$, as shown in FIG. 7C. When the pulse signal, whose pulse width is gradually increased, as shown in FIG. 7C, is output, the amplitude of the drive voltage output from the drive circuit 19 gradually increases in correspondence with the increase in pulse width, and the drive speed of the USM 21 also increases accordingly. FIG. 8 is a graph showing the drive characteristics of the USM 21. In FIG. 8, the drive frequency of the USM 21 is plotted along the abscissa, the drive speed is plotted along the ordinate, and FIG. 8 shows the characteristics obtained when the drive voltage amplitude is changed. In FIG. 8, assuming that the drive frequency f is constant, when the amplitude of the drive voltage is gradually increased while the drive frequency f=p, the drive speed of the USM 21 gradually increases, as shown in FIG. 8.

In this manner, the USM 21 begins to be driven in the instructed direction, and the shuttle which carries the optical card begins to move by the drive operation. The objective lens 9 moves toward the center of the optical head to follow the movement of the shuttle under the control of the tracking servo. When a predetermined period of time has elapsed from the start of the drive operation of the USM 21, the operation for changing the pulse width of the pulse width setting circuit 16 is stopped in accordance with an instruction from the MPU 5, and the output signal from the pulse width setting circuit 16 is restored to a signal having an original pulse width, as shown in FIG. 7A. Thereafter, the USM 21 is driven based on a normal output signal from the pulse width setting circuit 16, and the shuttle subsequently moves toward the center of the optical head. Upon movement of the shuttle, when the lens position sensor 11 detects movement of the objective lens 9 to a position near the center of the optical head, the MPU 5 outputs a control signal for gradually decreasing the pulse width to the pulse width setting circuit 16.

In response to this control signal, the pulse width setting circuit 16 outputs an output signal, so that the pulse width gradually decreases contrary to the start of the drive operation, as shown in FIG. 7B, thereby controlling the amplitude of the drive voltage from the drive circuit 19 to gradually decrease. When the amplitude of the drive voltage is gradually decreased, the drive speed of the USM 21 gradually decreases accordingly, as can be seen from FIG. 8. When a predetermined period of time has elapsed from the beginning of deceleration of the USM and the objective lens 9 has reached the center of the optical head, the MPU 5 outputs an OFF signal for instructing stopping of the drive operation of the USM 21 to the change-over switch 18, and the drive operation of the USM 21 is completely stopped. In this manner, the objective lens 9 returns to the center of the optical head, and tracking control is performed by finely moving the objective lens 9 in the tracking direction by the tracking servo loop, thereby recording/reproducing information on/from an information track.

In this embodiment, when the drive operation of the USM 21 is started, the amplitude of the drive voltage of the USM 21 can be gradually increased by gradually increasing the pulse width of the pulse width setting circuit 16, thereby gradually increasing the drive speed of the USM 21. On the other hand, when the drive operation of the USM 21 is stopped, the amplitude of the drive voltage of the USM 21 can be gradually decreased by gradually decreasing the pulse width of the pulse width setting circuit 16, thereby gradually decreasing the drive speed of the USM 21. Therefore, when the shuttle is moved using the USM 21, the USM 21 has high response characteristics, and the acceleration increases upon starting and stopping of the drive operation due to the high response characteristics. As described above, since the drive voltage is gradually increased and decreased upon starting and stopping of the drive operation of the USM 21, an abrupt acceleration and deceleration of the shuttle can be suppressed, and an increase in AT error amount can be prevented.

Figure 9A:
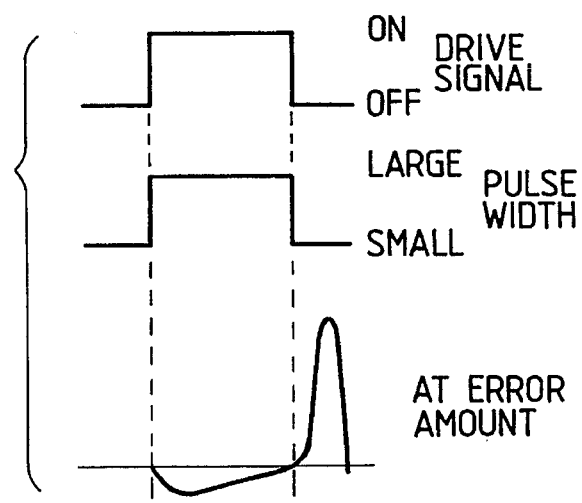
FIGS. 9A and 9B are charts for comparing the pulse widths and the AT error amounts between the prior art and the embodiment shown in FIG. 3.
Figure 9B:
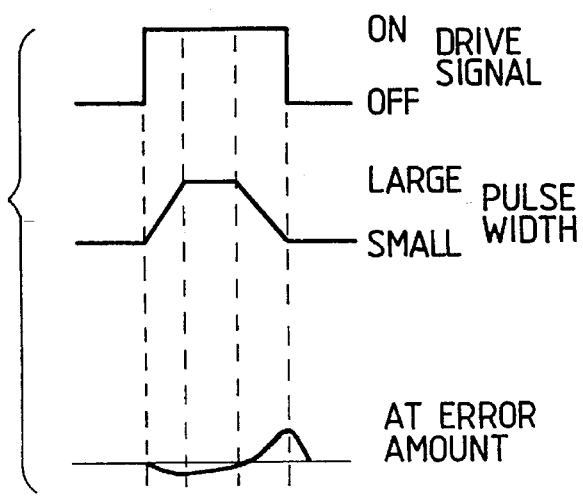

FIGS. 9A and 9B are charts for comparing the AT error amounts upon starting and stopping of the drive operation of the USM 21 between the prior art and this embodiment. FIG. 9A shows the AT error amount of the prior art, and FIG. 9B shows the AT error amount of this embodiment. The drive signal is a signal for instructing the drive or stop state of the USM 21 output from the MPU 5 to the change-over switch 18 (FIG. 3), and the pulse width is that of the output signal from the pulse width setting circuit 16. In the prior art, as shown in FIG. 9A, when the drive signal is set in an ON state, the pulse width is constant, and the AT error amount increases due to an abrupt acceleration of the shuttle upon start of the drive operation of the USM 21, and upon stopping of the drive operation, the AT error amount increases to several times that upon starting of the drive operation due to an abrupt deceleration of the shuttle. In contrast to this, in this embodiment, as shown in FIG. 9B, when the drive signal is set in an ON state, the pulse width is gradually increased, and when the drive signal is set in an OFF state, the pulse width is gradually decreased, thereby gradually increasing or decreasing the drive voltage amplitude. For this reason, the shuttle can be gradually accelerated or decelerated, and the AT error amount can be greatly reduced as compared to the prior art. Therefore, since the AT error amount can be decreased, failure of the AT control can be prevented unlike in the prior art, and the operation of the apparatus can be stabilized.

In the above embodiment, the drive voltage amplitude of the USM is gradually increased/decreased by gradually increasing/decreasing the pulse width of the output signal from the pulse width setting circuit. Alternatively, the drive voltage amplitude can be gradually increased/decreased by increasing/decreasing the pulse heights of the signals C, D, E, and F output from the change-over switch to the drive circuit.

[Second Embodiment]

FIG. 10 is a block diagram showing the second embodiment of the present invention. Note that the same reference numerals in FIG. 10 denote the same parts as in FIG. 3, and a detailed description thereof will be omitted. In this embodiment, the drive frequency of the USM 21 is gradually increased upon starting of the drive operation of the USM 21 (drive signal is ON), and the drive frequency is gradually decreased upon stopping of the drive operation (drive signal is OFF), thereby suppressing abrupt acceleration/deceleration of the shuttle. The drive frequency of the USM 21 is controlled by an input voltage supplied from the MPU 5 to the VCO 15 via the D/A converter 14, and a detailed control operation of the drive frequency will be described in detail later. In FIG. 10, since the pulse width of the VCO 15 need not be changed, no pulse width setting circuit 16 is arranged, and the VCO 15 directly outputs a signal to the ring counter 17. Other arrangements are the same as those in FIG. 3.

The operation of this embodiment will be described in detail below. Assume that information is recorded or reproduced on or from a skewed optical card like in the embodiment shown in FIG. 3, and the objective lens 9 moves to a position near the right or left limit of the movable range during scanning to an information track. Also, assume that the movable range of the objective lens 9 is a ±25-μm range. The position of the objective lens 9 is monitored by the lens position sensor 11. When the MPU 5 recognizes, based on the detection signal from the lens position sensor 11, that the objective lens 9 has reached a position near the limit of the movable range, the MPU 5 outputs, to the change-over switch 18, an ON signal for starting the drive operation of the USM 21 and the signal for instructing the setting of the rotational direction of the USM 21 based on the detection signal from the lens position sensor 11. At the same time, the MPU 5 outputs a control signal for gradually decreasing the drive frequency of the USM 21 only for a predetermined period of time to the VCO 15 via the D/A converter 14. The detailed operation thereof is as follows.

FIG. 11 is a graph showing the relationship between the drive frequency and the drive speed of the USM 21. Note that the drive frequency is used in an L region (low-frequency region) to have the resonance point as a boundary. When the MPU 5 outputs an ON signal to instruct the starting of the drive operation of the USM 21, the MPU 5 also outputs a signal for gradually increasing the input voltage to the VCO 15 only for a predetermined period of time to the D/A converter 14, and as a result, the drive frequency gradually increases from p to q for a predetermined period of time, as shown in FIG. 11. With this control, upon starting of the drive operation of the USM 21, the drive speed of the USM 21 gradually increases, and the shuttle is gradually accelerated without being abruptly accelerated. After the elapse of the predetermined period of time, the drive frequency is fixed at q, and the shuttle keeps moving in this state. When the lens position sensor 11 detects that the objective lens 9 has moved to a position near the center of the optical head, the MPU 5 outputs a signal for gradually decreasing the input voltage to the VCO 15 only for a predetermined period of time to the D/A converter 14. In response to this signal, the drive frequency of the USM 21 is gradually decreased from q to p, and the drive speed of the USM 21 gradually decreases accordingly. Therefore, the shuttle is gradually decelerated. After the elapse of the predetermined period of time, the MPU 5 outputs an OFF signal to stop the drive operation of the USM 21. In contrast to this, when the drive frequency is normally used in an H region (high-frequency region), the frequency is gradually decreased in the case of an acceleration, and is gradually increased in the case of a deceleration, thus attaining the same control as described above.

In the control of this embodiment, the drive frequency is gradually brought close to the resonance frequency upon starting of the drive operation of the USM, and is gradually moved away from the resonance frequency upon stopping of the drive operation. Therefore, as in the embodiment shown in FIG. 3, an abrupt acceleration or deceleration of the shuttle can be suppressed, and an increase in AT error amount can be prevented. FIGS. 12A and 12B are charts for comparing the AT error amounts in the ON and OFF states of the drive signal between the prior art and this embodiment. FIG. 12A shows the AT error amount in the prior art, and FIG. 12B shows the AT error amount in this embodiment. Note that in FIG. 12B, a region A corresponds to an acceleration region wherein the drive frequency of the USM 21 is gradually brought close to the resonance frequency, a region B corresponds to a constant speed region wherein the drive frequency is constant, and a region C corresponds to a deceleration region wherein the drive frequency is gradually moved away from the resonance frequency. In the prior art, as shown in FIG. 12A, when the drive signal is set in an ON or OFF state, the AT error amount increases. However, in this embodiment, as shown in FIG. 12B, the AT error amount in the ON or OFF state of the drive signal can be greatly reduced as compared to the prior art.

In the above embodiment, the drive frequency is changed by changing the input voltage to the VCO 15. However, the present invention is not limited to this. For example, a pulse signal output from the VCO 15 may be frequency-divided, and the drive frequency can be gradually changed by gradually changing the frequency division ratio upon starting and stopping of the drive operation of the USM 21.

[Third Embodiment]

The third embodiment of the present invention will be described below. In the embodiment shown in FIG. 3 or 10, an abrupt acceleration or deceleration of the shuttle is suppressed by changing the drive voltage amplitude or the drive frequency upon starting or stopping of the drive operation of the USM 21. However, in this embodiment, the drive speed of the USM 21 is gradually increased or decreased by intermittently outputting an ON or OFF signal from the MPU 5. The ON signal from the MPU 5 is a signal generated by the MPU 5 in FIG. 10 to instruct starting of the drive operation of the USM 21, and the OFF signal is a signal generated thereby to instruct stopping of the drive operation.

When the lens position sensor 11 in FIG. 10 detects that the objective lens 9 has moved to a position near the limit of the movable range, the MPU 5 outputs an ON signal for instructing starting of the drive operation of the USM 21 to the change-over switch 18. Of course, the MPU 5 also outputs a signal for instructing the setting of the drive direction of the USM 21. At this time, the MPU 5 supplies a constant input voltage to the VCO 15 in FIG. 10, and the drive frequency is constant. As shown in FIG. 13A, the ON signal is intermittently output, so that the cycle is gradually prolonged in the order of $T_1$, $T_2$, and $T_3$ while the duty ratio of the ON and OFF signals remains the same (about 50%). In response to this intermittent ON signal, the USM 21 is alternately driven and stopped. Since the drive time during the ON period is gradually prolonged, the drive speed of the USM 21 gradually increases, and the shuttle is gradually accelerated accordingly. The intermittent ON signal is output only for the predetermined period of time, and thereafter, a normal high-level ON signal is output.

In this manner, the shuttle is gradually accelerated, and when the objective lens 9 has reached a position near the center of the optical head, the MPU 5 in turn outputs an intermittent OFF signal, as shown in FIG. 13B. Contrary to the ON signal, the OFF signal is output, so that its cycle is gradually shortened in the order of $T_1$, $T_2$, and $T_3$. At this time, since the drive time of the USM 21 is gradually shortened, the drive speed gradually decreases, and the shuttle is gradually decelerated. After the elapse of the predetermined period of time, the OFF signal becomes a normal low-level signal, and the drive operation of the USM 21 is stopped.

Figure 14A:
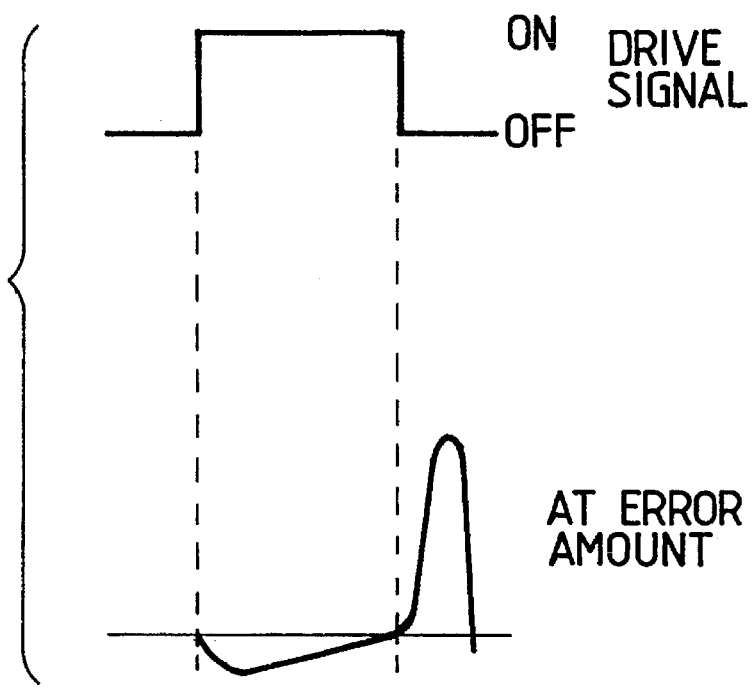
FIGS. 14A and 14B are charts for comparing the ON signals for instructing the drive operation of the USM and the AT error amounts between the prior art and the embodiment shown in FIGS. 13A and 13B.
Figure 14B:
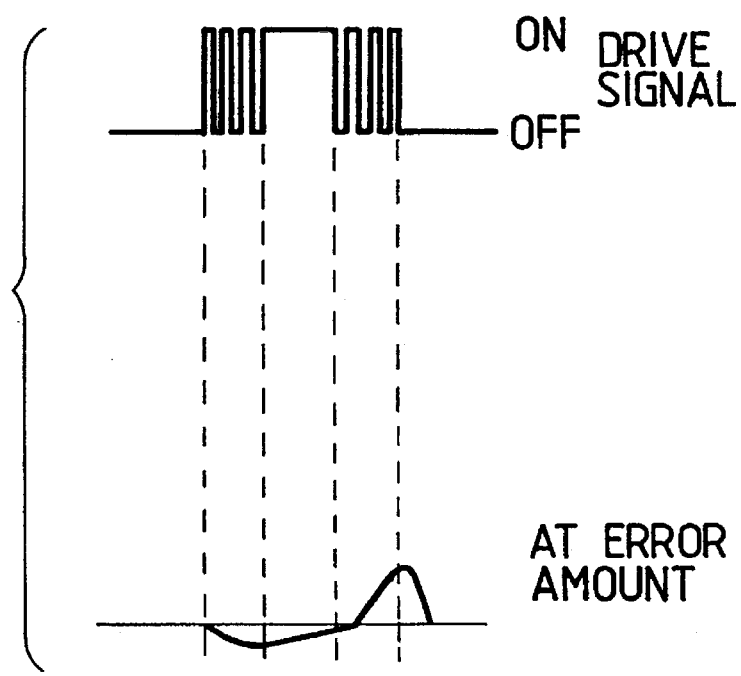

In this embodiment, upon starting and stopping of the drive operation of the USM 21, the ON and OFF signals are intermittently output, so that the drive time is gradually prolonged upon starting of the drive operation and is gradually shortened upon stopping of the drive operation. Therefore, an abrupt acceleration or deceleration of the shuttle can be suppressed as in the embodiment shown in FIG. 3 or 10. FIGS. 14A and 14B are charts for comparing the drive signals and the AT error amounts between the prior art and this embodiment. In this embodiment, the AT error amount can be greatly reduced, as shown in FIG. 14B, as compared to the prior art shown in FIG. 14A.

In this embodiment, the duty ratio of the ON and OFF signals remains the same (about 50%). However, the duty ratio may be arbitrarily set. Since the rate of increase or decrease in cycle of the ON/OFF signal determines the rate of increase in drive speed of the USM 21, it is preferable to set the rate of increase or decrease in cycle of the ON/OFF signal to be an optimal value in advance. Furthermore, in each of the three embodiments, the shuttle moves in the track intersecting direction. However, the shuttle may be fixed in the track intersecting direction, and the optical head may be moved by an ultrasonic wave motor in the track intersecting direction. In this case, the USM 21 can be controlled in the same manner as in the above embodiment upon starting and stopping of the drive operation of the optical head.

[Fourth Embodiment]

Figure 15:
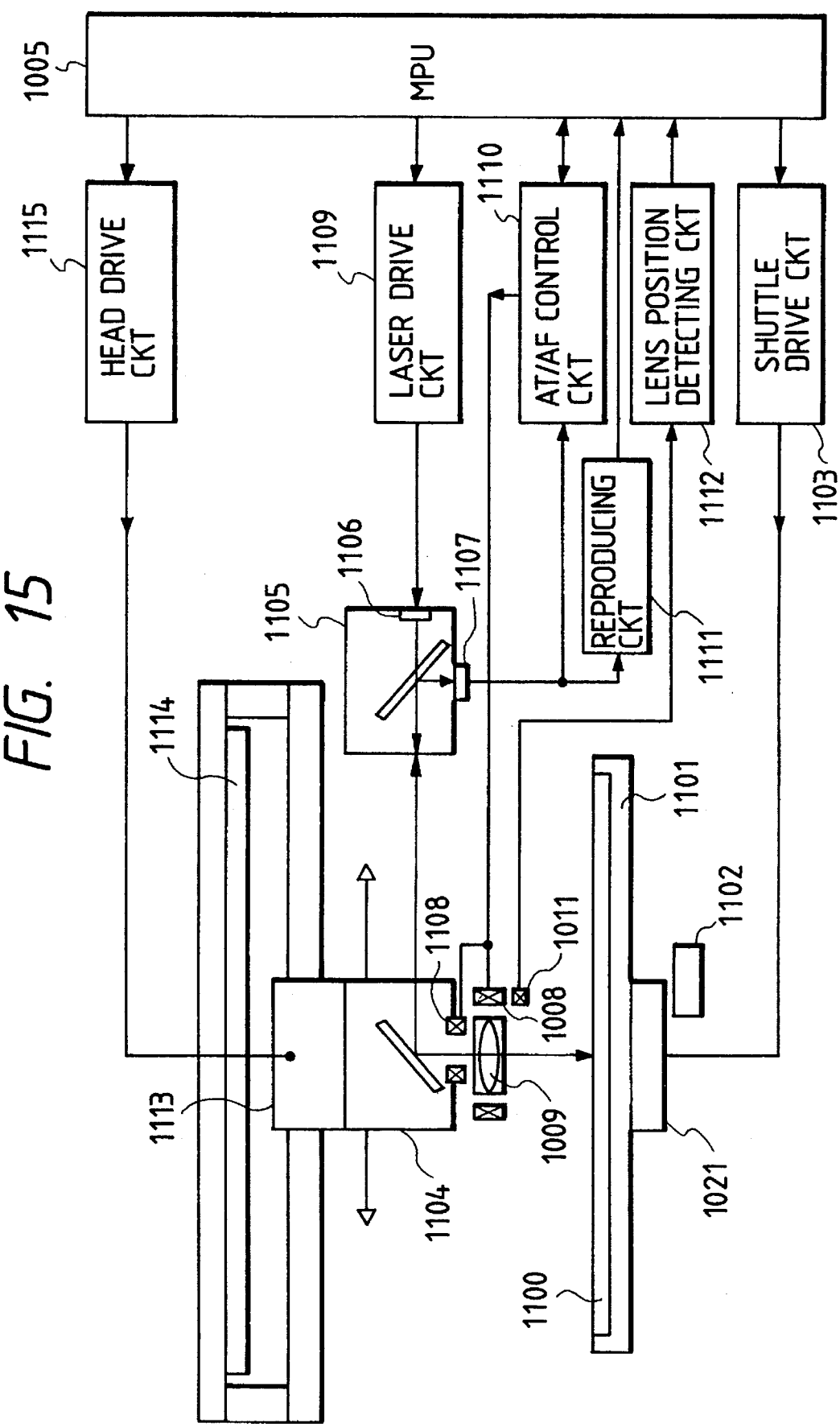
FIG. 15 is a block diagram showing the overall arrangement of an optical information recording/reproduction apparatus according to the fourth embodiment of the present invention.

The fourth embodiment of the present invention will be described below with reference to the accompanying drawings. Referring to FIG. 15, an optical card 1100 as an information recording medium is placed on a shuttle 1101. The shuttle 1101 can be moved in a direction perpendicular to tracks of the optical card 1100 upon driving of an ultrasonic wave motor 1021, and can scan a light spot to access a desired track on the optical card 1100, as described above. When the optical card 1100 is skewed, correction control with respect to the skew is performed to return an objective lens 1009 to the center of an optical head by driving the shuttle 1101. The ultrasonic wave motor 1021 contacts the shuttle 1101 since a guide plate 1102 is in press contact with the motor 1021, so that the driving force of the ultrasonic wave motor 1021 is transmitted to the shuttle 1101. The ultrasonic wave motor 1021 is controlled by a shuttle drive circuit 1103 on the basis of an instruction from an MPU 1005. The structure of the shuttle drive circuit 1103 will be described in detail below.

An optical head for irradiating the optical card 1100 with a recording/reproduction light beam is arranged above the upper surface of the optical card 1100. The optical head comprises a movable head 1104 and a stationary head 1105. The stationary head 1105 includes a semiconductor laser 1106 as a light source and a photodetector 1107 for detecting light reflected by the optical card 1100. As will be described later, the photodetector 1107 comprises information reproduction, focusing, and tracking photodetectors.

On the other hand, the movable head 1104 comprises the objective lens 1009 for focusing a light beam emitted from the semiconductor laser 1106 to a very small light spot, and irradiating the optical card 1100 with the light spot, an AT coil 1008 for driving the objective lens 1009 in the tracking direction, an AF (auto-focusing) coil 1108 for driving the objective lens 1009 in the focusing direction, and lens position sensors 1011a and 1011b for detecting the position, in the tracking direction, of the objective lens 1009.

The semiconductor laser 1106 in the stationary head 1105 is controlled by a laser drive circuit 1109 on the basis of an instruction from the MPU 1005, and information is recorded by intensity-modulating a light beam by a predetermined modulation method in an information recording mode. In an information reproduction mode, the light beam emitted from the semiconductor laser 1106 is controlled to be a low power with which recording cannot be attained. The detection signal from the photodetector 1107 in the stationary head 1105 is output to an AT/AF control circuit 1110. The AT/AF control circuit 1110 controls the AT coil 1008 and the AF coil 1108 on the basis of the input detection signal to displace the objective lens 1009 in the tracking and focusing directions, thus realizing tracking control and focusing control. A reproducing circuit 1111 reproduces recorded information on the basis of the detection signal from the photodetector 1107, and the MPU 1005 performs predetermined signal processing of the reproduced signal to generate reproduced data.

A lens position detecting circuit 1112 detects the position, in the tracking direction, of the objective lens 1009 on the basis of the detection signals from the lens position sensors 1011a and 1011b, and the detection result is supplied to the MPU 1005. The movable head 1104 is driven by a magnetic circuit constituted by a voice coil motor 1113 and a magnet 1114 to be reciprocally moved in the track direction of the optical card. With this reciprocal movement, the light spot is reciprocally moved relative to the optical card 1100, and scans on an information track. The voice coil motor 1113 is controlled by a head drive circuit 1115 on the basis of an instruction from the MPU 1005.

Figure 16:
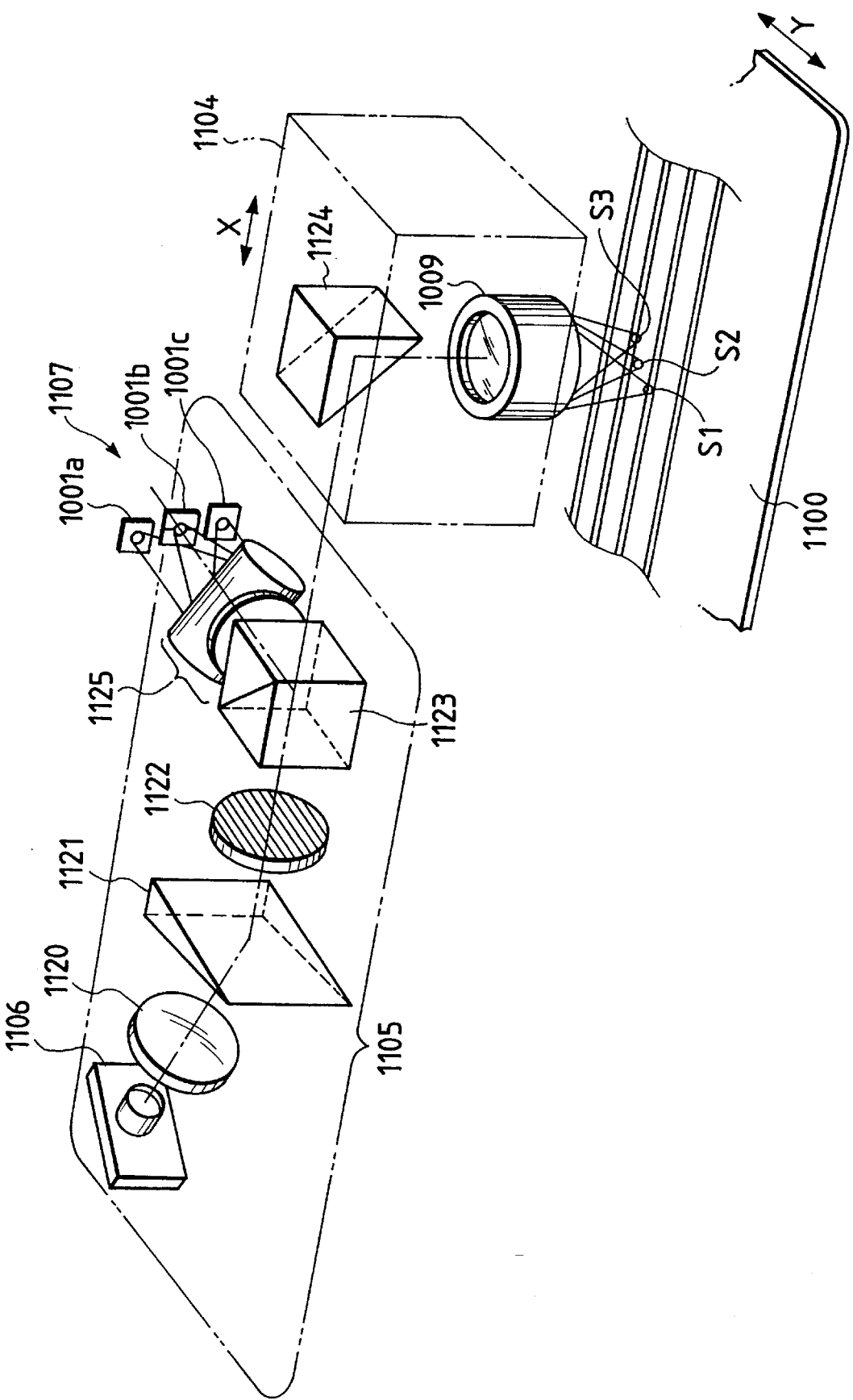
FIG. 16 is an exploded perspective view showing in detail an optical head portion in FIG. 15.

FIG. 16 shows the detailed arrangement of the optical head constituted by the movable head 1104 and the stationary head 1105. Referring to FIG. 16, the semiconductor laser 1106 is arranged in the stationary head 1105. A divergent light beam emitted from the semiconductor laser 1106 is collimated by a collimator lens 1120, and is then shaped by a light beam shaping prism 1121 to have a predetermined light intensity distribution. The light beam emerging from the light beam shaping prism 1121 is split into three light beams, i.e., a 0th-order diffracted light beam and ±1st-order diffracted light beams, and these split light beams are transmitted through a polarization beam splitter 1123. Furthermore, these light beams are reflected by a reflection prism 1124 in the movable head 1104 to be guided toward the objective lens 1009. The three light beams are focused by the objective lens 1009 to form very small light spots S1, S2, and S3 on the optical card 1100. The spot S1 is the light spot of the +1st-order diffracted light, the spot S2 is the light spot of the 0th-order diffracted light, and the spot S3 is the light spot of the −1st-order diffracted light.

As shown in an enlarged scale in FIG. 16, the light spots S1 and S3 are projected to partially extend on tracking tracks on the optical card 1100, and the light spot S2 is projected to be located on an information track between the tracking tracks. The reflectance of each tracking track is lower than that of the information track, and when the light spots S1 to S3 are shifted from the corresponding tracks in a given direction, the detection signals from photodetectors 1001a and 1001c for detecting reflected light of the light spots S1 and S2 are unbalanced. More specifically, by differentially detecting the detection signals from the photodetectors 1001a and 1001c, a tracking error signal which represents the shift amount and the shift direction of the light spot from the track is generated. The AT coil 1008 shown in FIG. 15 is driven on the basis of the tracking error signal to finely move the objective lens 1009 in the tracking direction (Y direction), thus realizing tracking control for preventing the information recording/reproduction light spot S2 from falling outside the information track.

The three light spots irradiated onto the optical card 1100 are reflected by the optical card surface, and are re-converted into collimated beams via the objective lens 1009. The light beams are guided to the polarization beam splitter 1123 via the reflection prism 1124, and are focused by a focusing lens system 1125 to be incident on the photodetector 1107. The photodetector 1107 comprises the photodetectors 1001a and 1001c, and a 4-split photodetector 1001b arranged therebetween. Of these photodetectors, the photodetectors 1001a and 1001c are used in tracking control, as described above, and the photodetector 1001b is used in focusing control and reproduction of information. The detection signals from the photodetectors 1001a to 1001c are output to the AT/AF control circuit 1110, and tracking control is executed on the basis of the tracking error signal, as described above. The AT/AF control circuit 1110 generates a focusing error signal on the basis of the detection signal from the photodetector 1001c, and the AF coil 1108 is controlled based on this signal, thus achieving focusing control.

Figure 17:
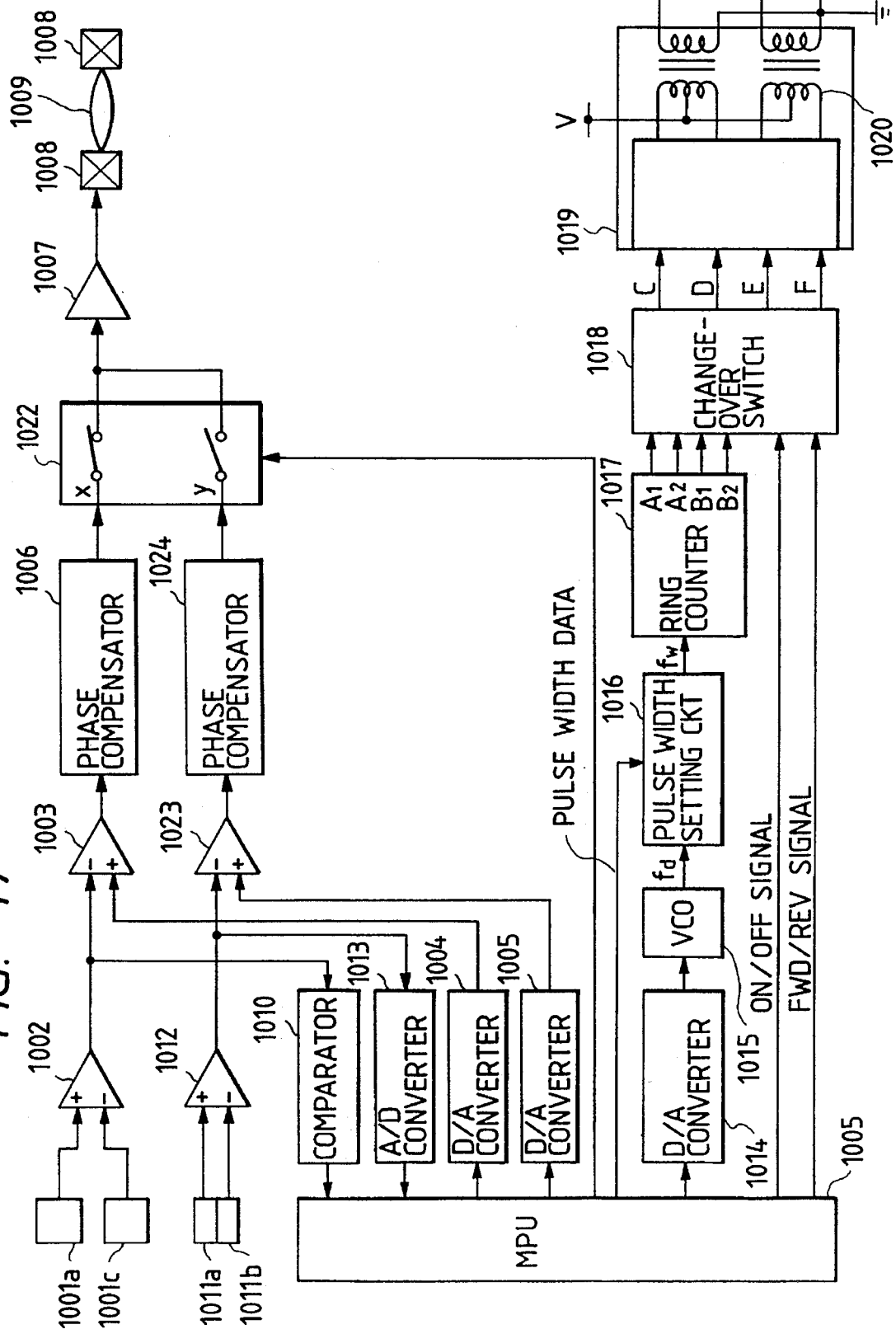
FIG. 17 is a block diagram showing the arrangement of main part of the optical information recording/reproduction apparatus according to the fourth embodiment of the present invention.

FIG. 17 is a block diagram showing the arrangement of main part of the optical information recording/reproduction apparatus according to the fourth embodiment of the present invention. Referring to FIG. 17, the detection signals from the photodetectors 1001a and 1001c for tracking control are differentially detected by a differential amplifier 1002 to generate a tracking error signal, as described above. Based on the tracking error signal, a tracking control loop constituted by a phase compensator 1006, an AT coil driver 1007, the AT coil 1008, and the like executes tracking control, so that the light spot irradiated by the optical head can be prevented from falling outside the information track on the optical card. The constituting elements of the tracking control loop are arranged in the AT/AF control circuit 1110 shown in FIG. 15. Although not shown in FIG. 17, a focusing control loop is also arranged in the AT/AF control circuit 1110, and focusing control is executed, so that the light spot is focused on the optical card surface.

The lens position sensors 1011a and 1011b detect the position, in the tracking direction, of the objective lens 1009, as described above, and a lens position signal is generated by differentially detecting the detection signals from these sensors by a differential amplifier 1012. The lens position signal is fetched by the MPU 1005 via an A/D converter 1013. The lens position signal is also output to a phase comparator 1024, the AT coil driver 1007, and the AT coil 1008 via a differential amplifier 1023, and the position control of the objective lens 1009 is executed by a position control loop for the objective lens 1009, which loop is constituted by the above-mentioned elements. The tracking control loop and the position control loop are changed over by a change-over switch 1022 on the basis of an instruction from the MPU 1005, as described above.

A D/A converter 1014, a VCO 1015, a pulse width setting circuit 1016, a ring counter 1017, a change-over switch 1018, and a drive circuit 1019 constitute a shuttle drive circuit for moving the shuttle in a direction perpendicular to the information track by driving the ultrasonic wave motor 1021. The shuttle drive circuit constituted by these elements is arranged in the shuttle drive circuit 1103 shown in FIG.

15. In this embodiment, the pulse width setting circuit 1016 is arranged at the output side of the VCO 15, so that the pulse width of the VCO 15 can be varied on the basis of pulse width data from the MPU 1005.

FIGS. 18A to 18H show signals of the respective units in the above-mentioned shuttle drive circuit. FIG. 18A shows a signal fd obtained by frequency-converting a voltage of the D/A converter 1014 by the VCO 1015, and FIG. 18B shows an output signal fw from the pulse width setting circuit 1016. The pulse width setting circuit 1016 can arbitrarily vary the pulse width of the output signal from the VCO 1015 on the basis of an instruction from the MPU 1005, as shown in FIG. 18B, and the varied signal fw is output to the ring counter 1017. The ring counter 1017 divides the input pulse signal into four-phase signals $A_1$ and $A_2$, and $B_1$ and $B_2$, which have a 90°phase difference therebetween, and outputs these signals. FIGS. 18C to 18F show output signals from the change-over switch 1018. The change-over switch 1018 combines the four-phase signals output from the ring counter 1017 in correspondence with the drive direction of the ultrasonic wave motor 1021, thereby generating drive phase outputs C, D, E, and F, as shown in FIGS. 18C to 18F. FIGS. 18G and 18H show drive signals to be applied from the drive circuit 1019 to the ultrasonic wave motor 1021. The drive circuit 1019 generates two-phase sine-wave drive signals G and H having a $\pi/2$ phase difference therebetween, as shown in FIGS. 18G and 18H, on the basis of the drive phase outputs, and applies these signals to the ultrasonic wave motor 1021.

The control operation of the shuttle in this embodiment will be described below with reference to FIGS. 19A to 19D. In an information recording or reproduction mode, the movable head 1104 is driven by the voice coil motor 1113 to reciprocally move in the track direction, and the light spot reciprocally moves relative to the optical card. At this time, the light spot from the movable head 1104 is controlled not to fall outside the information track and to maintain an in-focus state on the card surface by the effects of the tracking control loop and the focusing control loop. In this manner, the light spot scans on the information track to record or reproduce information.

When the optical card is skewed, since the tracking control is active, the objective lens 1009 moves in the tracking direction to follow the skew, and the position, in the tracking direction, of the objective lens 1009 at that time is detected by the lens position sensors 1011a and 1011b. The detected position is output as a lens position signal, as shown in FIG. 19A. Note that the lens position signal is obtained by differentially detecting the detection signals from the lens position sensors 1011a and 1011b by the differential amplifier 1012. In FIG. 19A, a point p represents the central position of the movable range of the objective lens 1009 (the central position of the objective lens 1009), and a point m represents one limit point of the right-and-left movable range in the tracking direction. The movable range of the objective lens 1009 is determined by the mechanical conditions of the tracking actuator and the conditions of the optical system. For example, the objective lens 1009 has a movable range of, e.g., about ±100 μm.

The lens position signal shown in FIG. 19A is fetched by the MPU 1005 via the A/D converter 1013. When the objective lens 1009 moves to follow the skew and reaches the limit point m of the movable range shown in FIG. 19A, the MPU 1005 outputs an ON signal for instructing driving of the ultrasonic wave motor 1021 to the change-over switch 1018 at a point $q_3$ where the objective lens 1009 has reached the limit point m, as shown in FIG. 19B. Of course, the MPU 1005 recognizes the moving direction of the objective lens 1009 on the basis of the lens position signal, and outputs an FWD/REV signal for instructing the setting of the drive direction of the ultrasonic wave motor 1021 to the change-over switch 1018 accordingly. Note that an FWD signal is output to instruct the forward drive, operation and an REV signal is output to instruct the reverse drive operation.

In this manner, the ultrasonic motor 1021 is driven, and the shuttle 1101 which carries the optical card 1100 begins to move in the direction perpendicular to the track. Upon movement of the shuttle 1101, since the tracking control is active, the objective lens 1009 returns to the center of the movable head 1104, as shown in FIG. 19A. In this case, the pulse width setting circuit 1016 is controlled by the MPU 1005 to set a normal pulse width, and after the drive operation is started, the ultrasonic wave motor 1021 is controlled to have a normal drive velocity. More specifically, the pulse width set by the pulse width setting circuit 1016 and the amplitudes of drive signals to be applied to the ultrasonic wave motor 1021 have a correlation therebetween. That is, when the pulse width is increased, the amplitudes of the drive signals shown in FIGS. 18G and 18H increase, and the drive velocity of the ultrasonic wave motor 1021 increases. On the other hand, when the pulse width is decreased, the amplitude of the drive signals decrease, and the drive velocity also decreases. Therefore, at the beginning of the drive operation of the ultrasonic wave motor 1021, the pulse width of the pulse width setting circuit 1016 is set in correspondence with a predetermined velocity, and the shuttle 1101 moves at a predetermined velocity. FIG. 19C shows the pulse width of the pulse width setting circuit 1016.

Figure 22A:
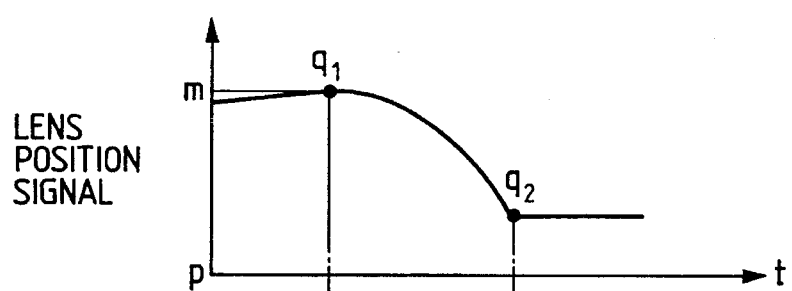
FIGS. 22A to 22C are views for explaining the control operation of an ultrasonic wave motor in a conventional apparatus.
Figure 22B:
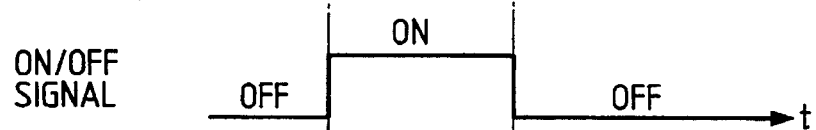
Figure 22C:
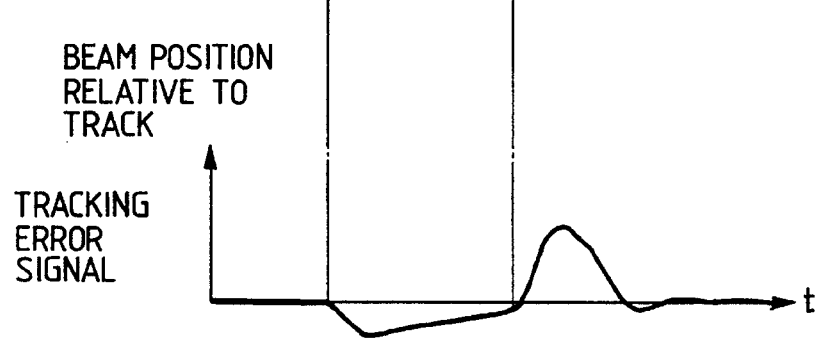

The MPU 1005 begins to measure a time period from the point $q_3$ where it outputs the ON signal, and after the elapse of a predetermined time period ta, the MPU 1005 outputs pulse width data to gradually decrease the pulse width to the pulse width setting circuit 1016 at a point $q_4$. Based on this data, the pulse width setting circuit 1016 operates to gradually decrease the pulse width, as shown in FIG. 19C, and the amplitudes of the drive signals to be applied to the ultrasonic wave motor 1021 decrease accordingly. For this reason, the ultrasonic wave motor 1021 begins to gradually decelerate at the point $q_4$. When the pulse width decreases to 0, as shown in FIG. 19C, the MPU 1005 outputs an OFF signal for instructing stopping of the ultrasonic wave motor 1021 to the change-over switch 1018 at a point $q_5$, as shown in FIG. 19B, and the ultrasonic motor 1021, which has been decelerated from the point $q_4$, completely stops its operation at the point $q_5$. FIG. 19D shows the tracking error signal obtained when the drive operation of the ultrasonic motor 1021 stops. In this embodiment, the pulse width is gradually decreased by the pulse width setting circuit 1016 to gradually decrease the amplitudes of the drive signals, thereby gradually decelerating the ultrasonic wave motor 1021. For this reason, as shown in FIG. 19D, the tracking error amount can be greatly reduced as compared to that in the prior art shown in FIG. 22C. In this manner, the objective lens 1009 returns to almost the center of the movable head 1104, and thereafter, the tracking control is similarly executed to record or reproduce information on the information track.

In this embodiment, when a predetermined period of time has elapsed from the beginning of the drive operation of the shuttle, the pulse width of the pulse width setting circuit is controlled to gradually decrease. For this reason, the amplitudes of the drive signals to the ultrasonic wave motor can be gradually decreased to gradually decelerate the ultrasonic wave motor. Therefore, when the shuttle is moved using an ultrasonic wave motor, an increase in acceleration at the end of the drive operation can be suppressed even if the ultrasonic wave motor has high response characteristics, thus preventing an increase in tracking error amount. In this manner, information can be accurately and stably recorded/reproduced while preventing an adverse effect of displacement of a light spot on recording/reproduction and preventing the tracking control from failing.

The method of setting the predetermined time period ta will be explained below.

When the deceleration rate (determined by the rate of change in pulse width upon deceleration of the shuttle in the pulse width setting circuit 1016) of the shuttle, which does not adversely influence the tracking control, is determined, a distance d traversed by the shuttle from the beginning to the end of deceleration can be determined on the basis of the velocity and load at the beginning of deceleration of the shuttle, the characteristics of the ultrasonic wave motor, and the like.

Since the velocity characteristic of the ultrasonic wave motor is substantially a primary response, the velocity V of the shuttle can be expressed as:

$$V = V_{S1}(1 - e^{-\frac{t}{\tau}}) \quad (1)$$

(where $V_{s1}$ is the saturated velocity of the shuttle, and $\tau$ is a time constant determined based on the inertial mass, the frictional force, and the characteristics of the ultrasonic wave motor.)

The following equation (2) representing the position x of the shuttle can be derived from integration of equation (1) above:

$$x = V_{S1}\{t - \tau(1 - e^{-\frac{t}{\tau}})\} \quad (2)$$

From the above equations, if the distance traversed by the shuttle from the beginning to the end of movement is represented by l, t (for t>>τ) obtained by solving equation (2) when x=l–d represents the time period required for moving the shuttle by the distance l–d. In other words, the calculated time period t is the predetermined time period ta.

[Fifth Embodiment]

The fifth embodiment of the present invention will be described below. In the embodiment described above with reference to FIGS. 19A to 19D, after an elapse of a predetermined period of time from the beginning of the drive operation of the ultrasonic wave motor 1021, the pulse width of the pulse width setting circuit 1016 is controlled to gradually decrease so as to gradually decelerate the ultrasonic wave motor 1021. However, in this embodiment, the velocity of the ultrasonic wave motor 1021 is detected, and when the velocity value has reached a predetermined value, the ultrasonic wave motor 1021 is gradually decelerated. This embodiment will be described below with reference to FIG. 17 and FIGS. 20A to 20E.

When the optical card 1100 is skewed during the tracking control, the objective lens 1009 moves to follow the skew, as described above. As shown in FIG. 20A, when the objective lens 1009 has reached the limit point m of its movable range, the MPU 1005 outputs an ON signal for instructing the drive operation of the ultrasonic wave motor 1021 to the change-over switch 1018 at a point $q_3$, as shown in FIG. 20B, and outputs a signal for instructing the setting of the rotational direction of the ultrasonic wave motor 1021, at the same time. Thus, the ultrasonic wave motor 1021 begins to rotate in the instructed direction upon driving of the change-over switch 1018 and the drive circuit 1019, the shuttle 1101 which carries the optical card 1100 begins to move in the direction perpendicular to the track, and the objective lens 1009 also begins to move toward the center of the movable head 1104 accordingly. On the other hand, a lens position signal shown in FIG. 20A is fetched by the MPU 1005 via the A/D converter 1013, and the MPU 1005 calculates a change in position per unit time of the objective lens 1009, i.e., the velocity of the objective lens 1009 on the basis of the position signal of the objective lens 1009. FIG. 20E shows the velocity of the objective lens 1009 calculated by the MPU 1005. When the ultrasonic wave motor 1021 is driven, the objective lens 1009 is accelerated, as shown in FIG. 20E.

When the velocity of the objective lens 1009 has reached a predetermined velocity S $$(= V_{S1}(1 - e^{-\frac{ta}{\tau}}),$$

where ta is the predetermined time period in the fourth embodiment), the MPU 1005 outputs pulse width data to the pulse width setting circuit 1016 at a point $q_4$ where the velocity of the lens has reached the predetermined velocity S in the same manner as in the above embodiment, and the pulse width of the pulse width setting circuit 1016 is controlled to gradually decrease from the point $q_4$, as shown in FIG. 20C. With this control, the amplitudes of the drive signals output from the drive circuit 1019 gradually decrease, and the ultrasonic wave motor 1021 begins to gradually decelerate. When the objective lens 1009 has reached a point $q_5$, the MPU 1005 outputs an OFF signal to the change-over switch 1018, as shown in FIG. 20B, and the ultrasonic wave motor 1021 completely stops at the point $q_5$. FIG. 20D shows a tracking error signal. Since the ultrasonic wave motor 1021 is gradually decelerated before its drive operation stops, the tracking error signal can be prevented from increasing as in the above embodiment.

As described above, according to this embodiment, when the velocity of the objective lens 1009 has reached a predetermined value, the pulse width of the pulse width setting circuit 1016 is gradually decreased to gradually decrease the amplitudes of the drive signals, thereby gradually decelerating the ultrasonic wave motor 1021. For this reason, an increase in tracking error amount at the end of the drive operation of the ultrasonic wave motor 1021 can be prevented as in the above embodiment. In this embodiment, the MPU 1005 calculates a change in position signal of the objective lens 1009 per unit time to detect the moving velocity of the objective lens 1009. However, the present invention is not limited to this. For example, the moving velocity of the objective lens 1009 may be detected using a differentiator.

[Sixth Embodiment]

The sixth embodiment of the present invention will be described below. In each of the embodiments described above with reference to FIGS. 19A to 20E, after an elapse of a predetermined period of time from the beginning of the drive operation of the shuttle or when the moving velocity of the objective lens 1009 has reached a predetermined value, the ultrasonic wave motor 1021 is gradually decelerated. However, in this embodiment, the ultrasonic wave motor 1021 is controlled to begin deceleration when the objective lens 1009 has moved by a predetermined distance (a distance (l–d) described in the fourth embodiment). This control will be described in detail with reference to FIGS. 17 and 21A to 21D. When the objective lens 1009 moves to follow a skew in the tracking control state, and the objective lens 1009 has reached the limit point m of its movable range, as shown in FIG. 21A, the MPU 1005 outputs an ON signal for instructing the performing of the drive operation of the ultrasonic motor 1021, as shown in FIG. 21B. At the same time, the MPU 1005 outputs a signal for instructing the setting of the rotational direction of the ultrasonic wave motor 1021. In this manner, the ultrasonic wave motor 1021 is driven, the shuttle 1101 moves in the instructed direction, and the objective lens 1009 begins to move toward the center of the movable head 1104.

The internal memory of the MPU 1005 stores a predetermined moving distance L (=l−d) of the objective lens 1009, and the MPU 1005 sequentially compares a lens position signal shown in FIG. 21A with the stored value. When the objective lens 1009 has moved by the moving distance L from a point $q_3$ and has reached a point $q_4$, as shown in FIG. 21A, the MPU 1005 outputs pulse width data to the pulse width setting circuit 1016, and the pulse width of the pulse width setting circuit 1016 is controlled to gradually decrease, as shown in FIG. 21C. With this control, the amplitudes of the drive signals output from the drive circuit 1019 are gradually decreased to gradually decelerate the ultrasonic wave motor 1021, and when the objective lens 1009 has reached a point $q_5$, the MPU 1005 outputs an OFF signal, as shown in FIG. 21B, thus completely stopping the ultrasonic wave motor 1021. In this embodiment as well, since the ultrasonic wave motor 1021 is gradually decelerated, a tracking error signal can be prevented from increasing, as shown in FIG. 21D.

In this embodiment, after the drive operation of the shuttle is started, when the objective lens 1009 has moved by a predetermined distance, the ultrasonic wave motor 1021 is gradually decelerated. For this reason, an increase in tracking error signal can be prevented as in the above embodiments.

In each of the above embodiments, the amplitudes of the drive signals for the ultrasonic wave motor are gradually decreased by gradually decreasing the pulse width of the pulse width setting circuit, thereby gradually decelerating the ultrasonic wave motor. Alternatively, the ultrasonic wave motor may be gradually decelerated by changing the drive frequency. Also, the ultrasonic wave motor may be gradually decelerated by repetitively outputting ON/OFF signals to be output to the change-over switch 1018 at an appropriate period. Furthermore, in each of the above embodiments, the shuttle which carries the optical card is moved in the direction perpendicular to the track. However, the shuttle may be fixed in the track intersecting direction, and the optical head portion may be controlled to move in the track intersecting direction by the method described in each of the above embodiments.

What is claimed is:

1. An optical information recording/reproducing apparatus in which relative movement between an optical information recording medium having a linear information track and an optical head is performed to cause a light beam radiating from the optical head to follow the information track by tracking control so as to perform at least one of recording and reproduction of information, comprising:

an ultrasonic wave motor for driving one of the medium and the optical head relative to the other; and control means for controlling said ultrasonic wave motor to gradually decrease the drive velocity thereof by changing the drive frequency of said ultrasonic wave motor so as to depart from the resonance frequency of said ultrasonic wave motor when the driving of said ultrasonic wave motor is to be stopped.

2. An apparatus according to claim 1, wherein said control means controls said ultrasonic wave motor to gradually increase the drive velocity thereof by changing the drive frequency of said ultrasonic wave motor so as to approach the resonance frequency of said ultrasonic wave motor when the driving of said ultrasonic wave motor is started.

3. An apparatus according to claim 2, wherein said control means controls said ultrasonic wave motor such that the drive frequency of said ultrasonic wave motor is made constant except for the start of drive of said ultrasonic wave motor and the stopping of the driving of said ultrasonic wave motor.

4. An apparatus according to claim 1, wherein said control means controls said ultrasonic wave motor to start deceleration of said ultrasonic wave motor after an elapse of a predetermined period of time from the starting of the driving of said ultrasonic wave motor.

5. An apparatus according to claim 1, wherein said control means controls said ultrasonic wave motor to start deceleration of said ultrasonic wave motor when the drive velocity thereof has reached a predetermined velocity after starting the driving of said ultrasonic wave motor.

6. An apparatus according to claim 1, wherein said control means controls said ultrasonic wave motor to start deceleration of said ultrasonic wave motor when one of the medium and the optical head is moved by a predetermined distance after starting the driving of said ultrasonic wave motor.

7. An optical information recording/reproducing method in which relative movement between an optical information recording medium having a linear information track and an optical head is performed to cause a light beam radiating from the optical head to follow the information track by tracking control so as to perform at least one of recording and reproduction of information, said method comprising the steps of:

moving one of the medium and the optical head relative to the other using an ultrasonic wave motor; and controlling the ultrasonic wave motor to gradually decrease the drive velocity thereof by changing the drive frequency of the ultrasonic wave motor to depart from the resonance frequency of the ultrasonic wave motor when the ultrasonic wave motor is to be stopped.

* * * * *

UNITED STATES PATENT AND TRADEMARK OFFICE
CERTIFICATE OF CORRECTION

PATENT NO. : 5,600,613          Page 1 of 2
DATED : February 4, 1997
INVENTOR(S) : KAZUAKI MATSUMOTO, ET AL.

It is certified that error appears in the above-indentified patent and that said Letters Patent is hereby corrected as shown below:

COLUMN 6:

Line 1, "An" should read --A--.

COLUMN 15:

Line 15, "90°phase" should read --90° phase--.

COLUMN 16:

Line 6, "drive," should read --drive--.

COLUMN 17:

Line 29, "motor.)" should read --motor).--.

UNITED STATES PATENT AND TRADEMARK OFFICE
CERTIFICATE OF CORRECTION

PATENT NO. : 5,600,613
DATED : February 4, 1997
INVENTOR(S) : KAZUAKI MATSUMOTO, ET AL.

It is certified that error appears in the above-indentified patent and that said Letters Patent is hereby corrected as shown below:

COLUMN 18:

Line 19, "where" should read --(where--.

Signed and Sealed this

Fifteenth Day of July, 1997

Attest:

BRUCE LEHMAN

Attesting Officer

Commissioner of Patents and Trademarks